(12) United States Patent
Chang et al.

(10) Patent No.: US 7,949,711 B2
(45) Date of Patent: May 24, 2011

(54) METHOD, SYSTEM, AND PROGRAM FOR INTEGRATING DISJOINED BUT RELATED NETWORK COMPONENTS INTO COLLABORATIVE COMMUNITIES

(76) Inventors: YPaul L. Chang, Portland, OR (US);
Chia Hao Chang, Portland, OR (US);
Man-Tsz Lan, Portland, OR (US)

( * ) Notice: Subject to any disclaimer, the term of this patent is extended or adjusted under 35 U.S.C. 154(b) by 292 days.

(21) Appl. No.: 12/061,986

(22) Filed: Apr. 3, 2008

(65) Prior Publication Data
US 2008/0177839 A1 Jul. 24, 2008

Related U.S. Application Data

(63) Continuation-in-part of application No. 11/626,596, filed on Jan. 24, 2007, now abandoned.

(51) Int. Cl.
*G06F 15/16* (2006.01)
*G06F 7/00* (2006.01)
(52) U.S. Cl. ........ 709/205; 709/203; 709/217; 707/705; 707/758
(58) Field of Classification Search .................. 709/209, 709/205, 203
See application file for complete search history.

(56) References Cited

U.S. PATENT DOCUMENTS

| | | | |
|---|---|---|---|
| 6,032,192 A * | 2/2000 | Wegner et al. ................. 709/206 |
| 6,201,794 B1 | 3/2001 | Stewart |
| 6,266,716 B1 | 7/2001 | Wilson |
| 6,334,151 B1 | 12/2001 | Bolam |
| 6,345,119 B1 | 2/2002 | Hotta |
| 6,408,282 B1 | 6/2002 | Buist |
| 6,457,049 B2 | 9/2002 | Lewis |
| 6,564,321 B2 | 5/2003 | Bobo, II |
| 6,742,003 B2 | 5/2004 | Heckerman |
| 6,757,730 B1 | 6/2004 | Lee |
| 6,920,475 B1 | 7/2005 | Klots |
| 7,016,882 B2 | 3/2006 | Afeyan |
| 7,051,071 B2 | 5/2006 | Stewart |
| 7,051,072 B2 | 5/2006 | Stewart |
| 7,080,092 B2 | 7/2006 | Upton |
| 7,093,261 B1 | 8/2006 | Harper |
| 7,110,969 B1 | 9/2006 | Bennett |
| 7,117,267 B2 | 10/2006 | Bavadekar |
| 7,143,186 B2 | 11/2006 | Stewart |
| 7,158,975 B2 | 1/2007 | Mazzagatti |
| 7,162,528 B1 | 1/2007 | Simonoff |
| 7,181,438 B1 | 2/2007 | Szabo |
| 7,210,148 B2 | 4/2007 | Arnold |
| 2002/0062388 A1 * | 5/2002 | Ogier et al. ................... 709/203 |
| 2002/0161647 A1 * | 10/2002 | Gailey et al. ................... 705/14 |
| 2003/0014513 A1 | 1/2003 | Ruths |
| 2003/0093479 A1 | 5/2003 | Mellen-Garnett |

(Continued)

*Primary Examiner* — Ian N Moore
*Assistant Examiner* — Jenee Williams

(57) ABSTRACT

A system for integrating disjoined but related network components is presented. The system includes a network including a plurality of integrated collaborators where at least one of the integrated collaborators is designated as a head, at least one of integrated collaborators is designated as a parent and at least one of integrated collaborators is designated as a child. The head, parent and child are connected by a plurality of links. The integrated collaborators are grouped into clusters where one or more clusters form a cluster cloud. The integrated collaborators are configured to receive a data set, from a connected member, in a pre-determined format and deliver the data set in an acceptable format to a receiving member over the network. If necessary, at least one integrated collaborator converts the pre-determined format to the acceptable format such that the network components communicate with each other and conduct collaborative activities.

14 Claims, 16 Drawing Sheets

U.S. PATENT DOCUMENTS

| | | |
|---|---|---|
| 2003/0120593 A1 | 6/2003 | Bansal |
| 2004/0205129 A1 | 10/2004 | Bongiorni |
| 2005/0055306 A1 | 3/2005 | Miller |
| 2005/0086206 A1 | 4/2005 | Balasubramanian |
| 2005/0097440 A1 | 5/2005 | Lusk |
| 2005/0131924 A1 | 6/2005 | Jones |
| 2005/0216429 A1 | 9/2005 | Hertz |
| 2006/0123127 A1 | 6/2006 | Littlefield |
| 2006/0129942 A1 | 6/2006 | McCary |
| 2006/0165040 A1 | 7/2006 | Rathod |
| 2006/0178918 A1 | 8/2006 | Mikurak |
| 2006/0230071 A1 | 10/2006 | Kass |
| 2007/0013948 A1 | 1/2007 | Bevan |
| 2007/0100961 A1 | 5/2007 | Moore |

* cited by examiner

METHOD, SYSTEM, AND PROGRAM FOR INTEGRATING DISJOINED BUT RELATED NETWORK COMPONENTS INTO COLLABORATIVE COMMUNITIES

CROSS-REFERENCE TO RELATED APPLICATIONS

The present continuation-in-part patent application claims priority benefit of the U.S. nonprovisional patent application Ser. No. 11/626,596 filed on Jan. 24, 2007 now abandoned under 35 U.S.C. 120, which is hereby incorporated by reference for all purposes.

FIELD OF THE INVENTION

The present invention relates generally to integrated framework architectures and software system collaborations. More particularly, the invention relates to an integrated and collaborative framework for communication between collaborative communities using various software systems and protocols in a global service computing environment to form highly scalable global/enterprise collaborative business/computing models with centralized control and distributed management and operation.

BACKGROUND OF THE INVENTION

Traditionally, when two software systems communicate, the systems first need to develop some kind of standard format into which both systems convert their data before transferring a batch of data/records to each other and the data/records can then be loaded into the partner's database. It can be time-consuming to reach an agreement on a data or record format, to write a data conversion interface, and even costly to develop the communication interfaces between the software systems. To implement similar projects with all business partners is nearly impossible. Therefore, most business transactions are still relying on paper-related technology. Electronic data interchange (EDI) has been used to conduct business electronically; however, it is only a point-to-point communication and the cost to implement EDI is high. A value added network (VAN) on the other hand allows multiple business partners to transfer data electronically, although a VAN only provides a vehicle to transfer bulk data and it is a type of batch process of business data.

Recently, e-commerce is emerging, and there are different ideas of creating enterprise solutions to emphasize integration and collaboration on enterprise data exchanges. A highly scalable and integrated architecture and infrastructure are needed to support business partner communization, collaborative business activity interaction and automation, and collaborative business intelligence at the scales of both enterprises and global business communities.

The practice of the basic service oriented architecture (SOA) is implemented in the data and the procedure invocation or web service levels, however, the received data still needs to undergo record format transformation or mapping at the receiving site. Enterprise Service Bus (ESB) could be implemented as a distributed bus with structured centralized hub-and-spoke architecture; however, without a well-integrated architecture between business partners, the collaborative interaction of business activities or web service invocations are the Product of Cartesian of the total business partners or collaborators involved. It complicates performance and security concerns in a collaborative e-business environment. To achieve the scopes of both enterprise and global service infrastructure, for example, Global Service Bus or GSB, architecture is needed to integrate and communize business partners, as is an infrastructure with built-in business intelligence to eliminate or reduce the direct interaction between communized business partners or between collaborators.

With current published methods for collaborative e-commerce, many discussions involve the ways of effectively exchanging data between business partners. Intents should be incorporated into business data to enliven the collaborative transaction and give the transaction more semantics for business partners to understand the intentions and increase operational productivity. Therefore, it is important for a collaborative infrastructure to support collaborative e-commerce interoperation with intents or accents, and the collaborative business activity flow automation can be more robust.

With current practices and published methods, a collaborative system supports either point-to-point or broadcasting delivery. A robust collaborative infrastructure supporting both point-to-point and broadcasting delivery is needed. The broadcasting capability should have the flexibility of specifying by members, member groups or by scopes of communities or community groups, either the upstream parent groups or the downstream descendant groups.

There are several currently known methods that focus on the implementation of hubs for use with a collaboration system for handling messages of conversations between members. However, these methods are lacking a robust infrastructure and architecture for central control and do not include an enhanced family tree hierarchy with root heads for connecting foreign-clustered communities or parent nodes to connect domestic communities with the same cluster and alien nodes to connect heterogeneous clouds. Clouds are communities that are not controlled by nor conform to the same implemented architecture. The present methods also lack a definition of the architecture or framework for communizing or grouping related business partners. Therefore, with the present methods, the user is not given a method for managing or controlling a community of business partners. Furthermore, these methods only provide local routing because a hub can only view its connected hubs.

One of the important factors that will make collaborative e-commerce prevail is that the collaborative commerce items and on-demand service offered by the communities can be swiftly identified through a search engine and the result rendered in a commerce-ready format by which users conduct business activities directly. With today's search engines, there are multiple steps taken and websites visited, before arriving at a page where business activity can be conducted, and the result of each transaction is discrete; there are no correlations between business activities conducted on different sites. A robust, integrated and collaborative framework with global address schemes is needed to streamline the collaborative process from commerce search to the completion of transactions in a coordinated systematic way Another important factor needed for successful collaborative e-commerce is a well-controlled resource management system. In a collaborative computing environment, reusability of resources is extremely important to reduce duplicated work and increase accuracy and efficiency, especially on the collaborative business data and format mapping efforts. Once the data or mapping profiles have been created, the same data should be used for the transformation of the data between business partners for the complete course of the business activity cycle, and the mapping profiles should be shared by the whole community using the same format. Further, collaborative business data should be utilized for the purpose of providing business intelligence at the local, regional and global levels to help business partners analyze the health of their business. A robust integrated and collaborative framework is needed to achieve these goals.

The address scheme used in today's internet world is basically sufficient for the usage of single domain. We need to have an address scheme that can provide ways of constructing cross-domain addresses for the needs of global ecommerce, global on-demand service provisioning, and global Service Oriented Architecture, which makes inter-domain communication possible A currently known method for both Real Application Cluster and Federated Server clustering of Application servers or database servers suggests using a group of application servers or database servers as a cluster. There is no specific structure by which the clustered servers should be arranged to achieve a higher efficiency and performance. There is basically a one level structure where loads are shared between the servers. There is a need for a highly efficient integrated and collaborative framework structures to arrange clustered servers.

In a Storage Area Network, the number of disks in the Disk Array Enclosure (DAE) is limited by the capacity of Disk Processor Enclosure (DPE) can support. As the needs for storage increases, more DPE and DAE are put into the fabric network. As the number of DPE increases, so as the complexity and the overhead. There are needs for a highly efficient integrated and collaborative framework structures that are well fitted to provide clustered DPEs with central controls and make Logical Unit Number (LUN) spindles created across DAEs possible, and to gain the collaborated processing power of the clustered DPEs and memory caches.

As online gaming and cyber gaming tournaments grow in popularity, there is a need for highly efficient integrated and collaborative framework structures that provide structures for online gaming hosts to collaborate together and form a more robust gaming playground.

As national and local electronic voting is adopted, there is a need for highly efficient integrated and collaborative framework structures with centrally controlled and distributed management and operation.

In view of the foregoing, there is a need for improved techniques for providing a robust integrated and collaborative framework supporting both point-to-point and broadcasting delivery of business data and services in a global collaborated computing environment.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 6a, 6b, 6c, 6-1 and 6-2 are flow charts illustrating an exemplary flow control of UOW delivery, including collaborative point-to-point and broadcasting-by-scopes transactions, on-demand service provisioning, delivery smart recovery, and persistence handling in an integrated and collaborative computing environment, in accordance with an embodiment of the present invention. FIGS. 6a, 6b, and 6c illustrates the comprehensive flow control, FIG. 6-1 illustrates the portion of delivery smart recovery of the IFAnet flow control process, and FIG. 6-2 illustrates the logic flow of on-demand service provisioning;

Figure 1:
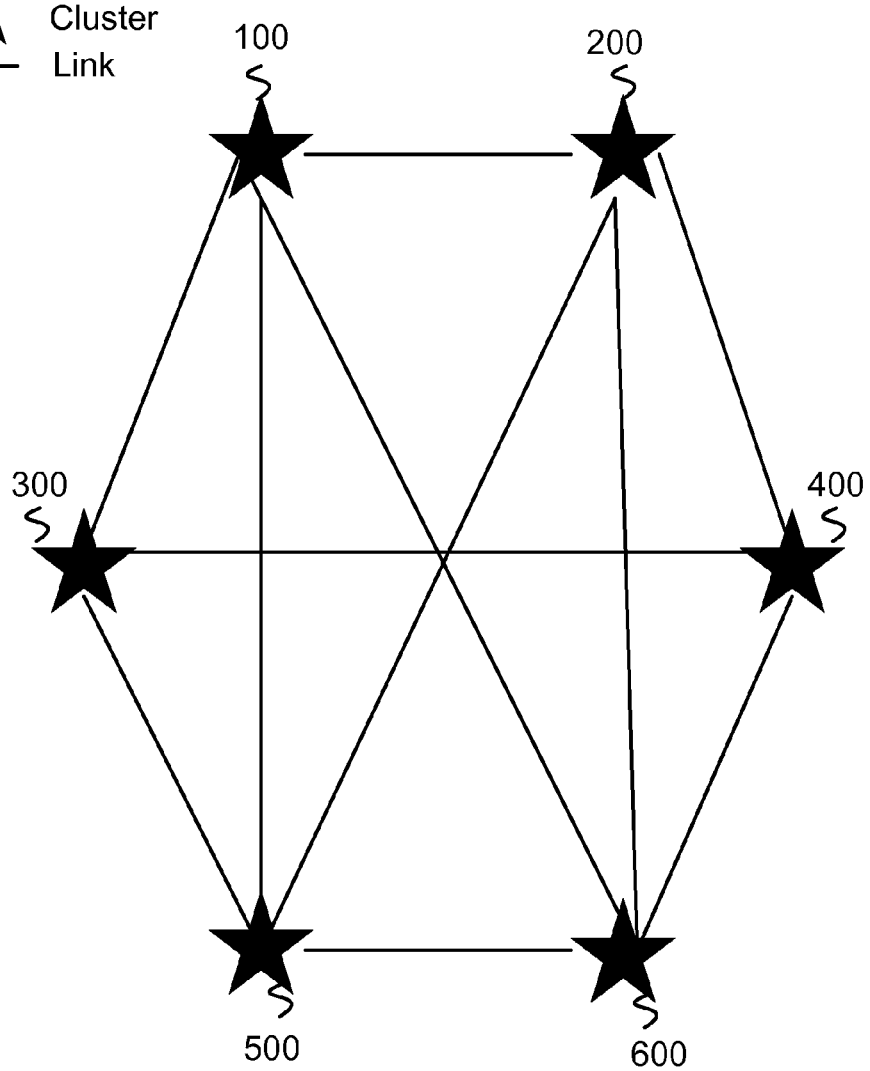
FIG. 1 illustrates an exemplary cluster cloud in an integrated and collaborative computing environment, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a method, system, and program for integrating disjoined but related network components into collaborative communities is presented.

In one embodiment, a method for integrating disjoined but related network components is presented. The method includes the steps of sending a data set having a pre-determined format to an integrated collaborator for delivery to at least one receiving member over a network including a plurality of integrated collaborators grouped into at least one or more clusters where one or more clusters form a cluster cloud and receiving from one of the plurality of integrated collaborators the data set in an acceptable format where, if necessary, at least one integrated collaborator has converted the pre-determined format to the acceptable format whereby the network components communicate with each other and conduct collaborative activities. Another embodiment further includes the step of specifying a format key corresponding to the pre-determined format allowing the integrated collaborator to indicate if conversion of the pre-determined format to the acceptable format is required. Yet another embodiment includes the step of specifying a destination address allowing the integrated collaborator to determine a path by which the data set will travel over the network with a least amount of connections between integrated collaborators and which of the plurality of integrated collaborators can perform the conversion if the conversion is indicated. Other embodiment include the steps of indicating a delivery option for the data set where delivery options include point-to-point and broadcast and indicating a broadcast scope where broadcast scopes include delivery to a selected integrated collaborator, delivery downstream from a selected integrated collaborator and delivery upstream from a selected integrated collaborator. Still other embodiment include the step specifying if a copy of the data set is to be retained on the network after the data set is delivered and including with the data set an indication of the intent of the data set. In another embodiment the data set includes a unit of work (UOW).

In another embodiment a method for integrating disjoined but related network components is presented. The method includes steps for sending a data set over a network including a plurality of integrated collaborators and steps for receiving from one of the plurality of integrated collaborators the data set in an acceptable format whereby the network components communicate with each other and conduct collaborative activities. Another embodiment further includes steps for indicating if conversion of the format conversion of the data set is required. Yet another embodiment further includes steps for specifying a destination address such that a path by which the data set will travel can be determined. Other embodiments further include steps for indicating a delivery method for the data set and steps for, if the delivery method is broadcast, indicating a broadcast scope. Still other embodiments further include steps of specifying a persistence of the data set on the network and steps for including an indication of the intent of the data set.

In another embodiment, a system for integrating disjoined but related network components is presented. The system includes a network including a plurality of integrated collaborators where at least one of the plurality of integrated collaborators is designated as a head, at least one of the plurality of integrated collaborators is designated as a parent and at least one of the plurality of integrated collaborators is designated as a child, the head, parent and child being connected by a plurality of links, the plurality of integrated collaborators being grouped into at least one or more clusters where one or more clusters form a cluster cloud where the plurality of links connect the clusters and the cluster clouds, the integrated collaborators configured to receive a data set, from a member connected to a one of the plurality of integrated collaborators, in a pre-determined format and deliver the data set in an acceptable format to at least one receiving member over the network including, where, if necessary, at least one integrated collaborator has converted the pre-determined format to the acceptable format such that the network components communicate with each other and conduct collaborative activities. In another embodiment the head includes a dynamic mapping of relations of integrated collaborators within the cloud such that a destination path for the data set can be determined. In another embodiment the head includes Directory Information Tree Schema with various object class definitions for constructing cluster cloud collaborator links, Category Structures shared within the same cluster where all the servers with the same cluster share the same category structure for the services and merchant items that their members offer, and category Structure Mapping for inter-cluster transaction. Yet another embodiment includes a mapping profile for converting from the pre-determined format to the acceptable format and the mapping profile is shared by the integrated collaborators. In other embodiments the collaborative activities includes a search engine and on-demand service provisioning.

In another embodiment, a system for constructing an inter-domain address sequence using multiple notations in an integrated collaborative computing environment. Using multiple notations not only distinguish different addressable object among multiple domains but also correlate these domains together to form a globally unique addresses for the object, based on the domain relationship.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

The preferred embodiment of the present invention provides an integrated framework architecture, called IFAnet, where disjoined but related network components are integrated into collaborative communities, with the concept of central control distributed management and operation, using enhanced family tree and cluster cloud structures to provide a highly efficient infrastructure by which integrated components can communicate with each other and conduct collaborative activities. In the preferred embodiment, community members connect and submit a data set or specific unit of work (UOW) requests with pre-determined formats to the cloud structures via ushers, called integrated collaborators or i-Collaborators, and the usher i-Collaborators forward the requests to their connected i-Collaborators, for example, without limitation, parents, children, relatives, or foreigners, with a pre-determined path, destination i-Collaborator path (DIP), until the destination i-Collaborators are reached, and which deliver the requests to their serving community members, based on the delivery option, point-to-point or node/cluster level upstream/downstream broadcast by scopes.

In the preferred embodiment, collaborators are connected in the relations of parent, child, relatives, foreign, and alien where a parent and child relation constructs the fundamental structure, and family trees and relatives' relations enhance the integrations within clusters. A cluster is a complete family tree and is represented by the root or head of the family tree. The head is in charge of tracking cluster topology, synchronizing directories, making cluster-wide parameters and extending communication channels across clusters. A cloud comprises multiple clusters. Clouds are communities that are not controlled by nor conform to the same underlining implementation architecture. Foreign relations enhance the integrations between clusters. Alien relations extend the integrations between heterogeneous clouds and cloud forests. In the preferred embodiment, clusters are identified by the head i-Collaborators where foreign clusters are connected, and heterogeneous clouds are linked via i-Collaborators who are capable of mediating the format translations and package forwarding. By way of example, in many applications, by using such links, every entity is capable of acting as a heart of a star to link itself to any other entity with the network. Depending on different level of scopes, every group or community could be seen as the heart of a bigger star to connect itself to any other groups or communities in the network. Accordingly, a "Stars of Stars" (S.o.S.) architecture is formed. The IFAnet S.o.S. architecture of the preferred embodiment of the present invention provides communization, data privatization and security, load balancing, high scalability and availability, traffic localization, and communication globalization. The preferred embodiment provides Directory Information Tree (DIT) schema for defining community relation on directory servers to form a enhanced tree structure and enable each collaborator to act as the heart of a star, a collaborative framework for integrating heterogeneous software used by community members, for enterprise and global On-Demand services, Global collaborative Grid Computing, a commerce-ready search engine infrastructures, which comprises collaborative and synchronized service and item directory servers carrying the same prearranged schema structures, Cyber Gaming Tournament Model, National Electronic Voting Server Clustering and Collaborating, Storage Area Network DPE/DAE Clustering and Collaborating, Application/Database Server Clustering and Collaborating and a plug-n-trade collaborative business intelligent activity model where collaborative e-commerce business partners are communized based on common interests.

Under the architecture of the preferred embodiment, the integration occurs at the following levels: when network entities sharing common interests are communized, when community members connect to the network and are served by usher i-Collaborators, when clustered i-Collaborators are linked to each other with different types of links to form larger scope of communities, when heads of clusters are tied to form even larger scope of communities, and when heterogeneous clouds are connected together to form global communities.

The followings are the definition of the proposed architecture according to an embodiment of the present invention.

FIG. 1 illustrates an exemplary cluster cloud in an integrated and collaborative computing environment, in accordance with an embodiment of the present invention. In the present embodiment, a cluster cloud is comprised of many clusters. Clusters are connected by heads 100, 200, 300, and 400 via cluster links.

Figure 2:
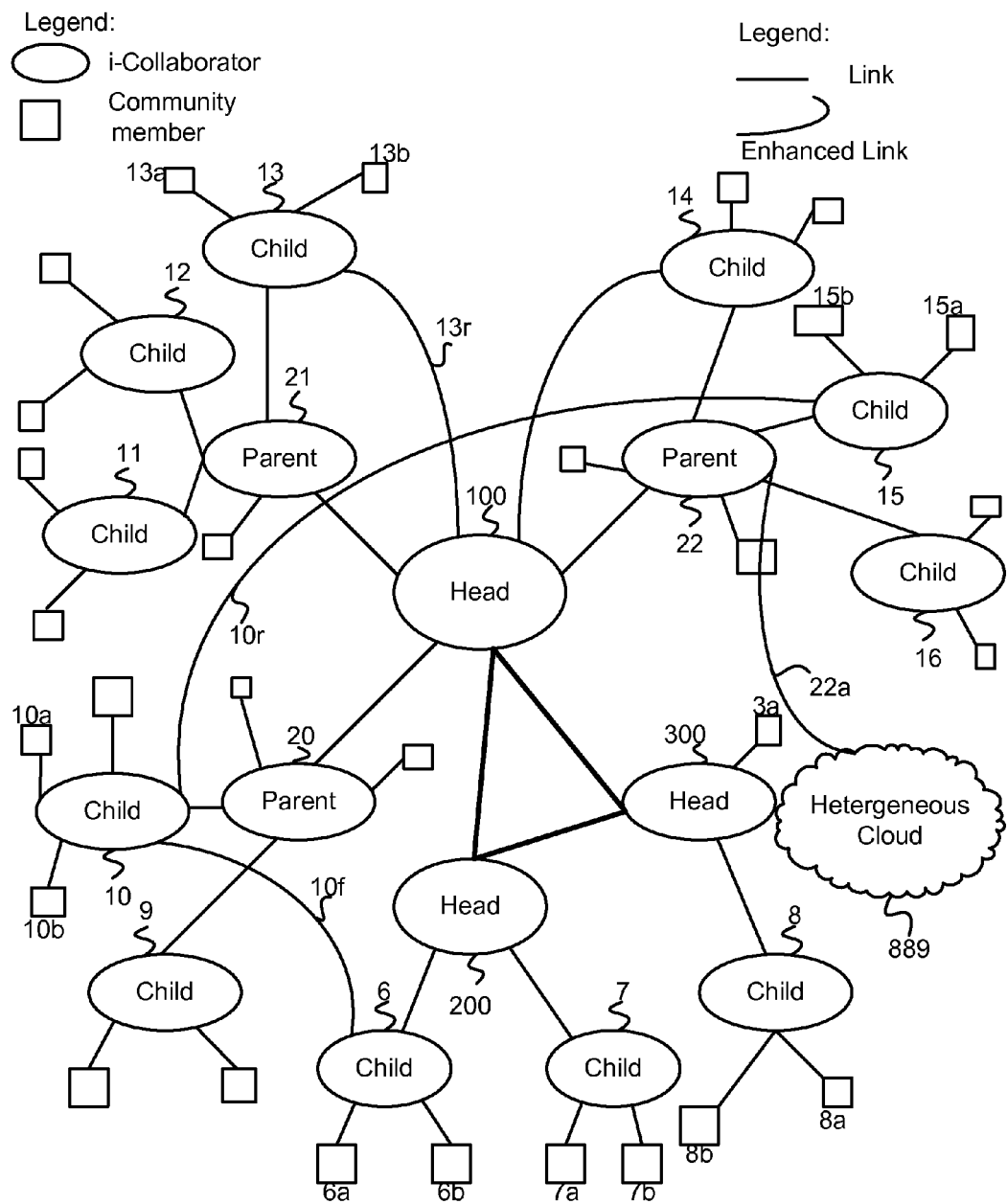
FIG. 2 illustrates an exemplary integration and collaboration of network components together using an integrated architecture and i-Collaborators, in accordance with an embodiment of the present invention.

FIG. 2 illustrates an exemplary integration and collaboration of network components together using an integrated architecture and i-Collaborators, in accordance with an embodiment of the present invention. In the present embodiment, a cluster is comprised of one head 100 and many communized parent i-Collaborators 20, 21 and 22, and each parent i-Collaborator 20, 21 and 22 can have many child i-Collaborators 9 through 15. Child i-Collaborators 9 through 15 may have their own child i-Collaborators. Child i-Collaborators or child nodes can have community members; for example, without limitation, child i-Collaborator 10 has community members 10a and 10b. Community members communicate with each other through the network. Clustered i-Collaborators are connected naturally with a parent and child relation within a cluster with the basic links and are connected with ancestors including, but not limited to, the head via ancestor links and head links. Clustered i-Collaborators can also connect to i-Collaborators that are their relatives including, but not limited to, a child i-Collaborator within the same cluster via a relative link. For example, without limitation, child i-Collaborator 10 is connected to child i-Collaborator 15 through a relative link 10r. Clustered i-Collaborators can also connect to i-Collaborators of different clusters via foreign links, such as, but not limited to, a foreign link 10f connecting child i-Collaborator 10 to child i-Collaborator 6. In the present embodiment, parent i-Collaborator 22 connects to a heterogeneous cloud 889 via an alien link 22a and provides a communication channel between clouds. The types of different links carry the nature of the connections. For example, without limitation, a basic link is generally more trustworthy than a foreign link. A basic link, for example, can represent, without limitation, the communication between departments within a company. A relative link, for example, can represent, without limitation, the communication between companies within an enterprise. A foreign link, for example, can represent, without limitation, the communication between established business partners across clusters. An alien link, for example, can represent, but without limitation, the communication between business partners across cluster clouds. Head links, ancestor links, relative links and foreign links enable the distance between communized collaborators to be shortened and increase the communication throughput and data transmission security between two collaborators, and alien links extend relationships between communities of cluster clouds. The present embodiment provides categorized security according to the type of link.

Figure 12:
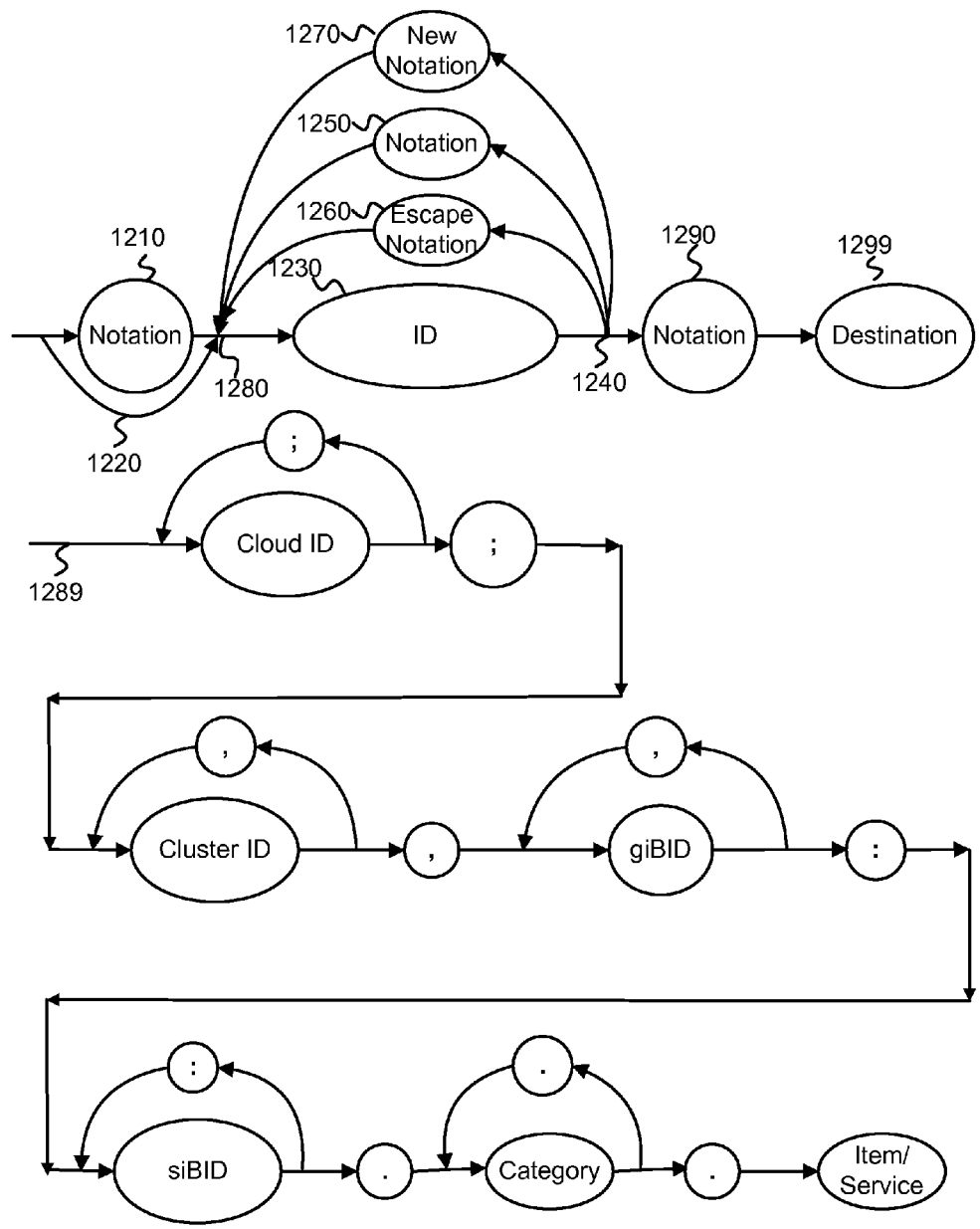
FIG. 12 illustrates an exemplary flow to construct an inter-domain address sequence using multiple notations and an example of locating a service item in an integrated collaborative ecommerce system comprising a multiple domain communities in a cluster cloud network.

TABLE 1 illustrates an exemplary address scheme used to uniquely identify a network entity in an integrated and collaborative computing environment shown by way of example in FIG. 12, in accordance with an embodiment of the present invention. In the present embodiment, a cluster in the cluster cloud is uniquely identified by its head number in the address scheme. A clustered i-Collaborator is uniquely identified by its head number and its own i-Collaborator number. Each community member is identified by a unique address assigned by the usher i-Collaborator and the address of the usher i-Collaborator.

TABLE 1

IFAnet Address Scheme Example For Cluster Cloud ID 999

| Cloud ID | Cluster ID | i-Collaborator ID | bizStar ID |
|---|---|---|---|
| 100 | 999 | 66666 | 1687 | |
| 20 | 999 | 66666 | 1688 | |
| 10a | 999 | 66666 | 1688 | 88 |
| 10b | 999 | 66666 | 1688 | 89 |
| 21 | 999 | 66666 | 1689 | |
| 9a | 999 | 66666 | 1689 | 88 |
| 9b | 999 | 66666 | 1689 | 89 |
| 200 | 999 | 66667 | 1687 | |
| 22 | 999 | 66667 | 1688 | |
| 6a | 999 | 66667 | 1688 | 88 |
| 6b | 999 | 66667 | 1688 | 89 |
| 23 | 999 | 66667 | 1689 | |
| 7a | 999 | 66667 | 1689 | 88 |
| 7b | 999 | 66667 | 1689 | 89 |
| 300 | 999 | 66668 | 1687 | |
| 24 | 999 | 66668 | 1688 | |
| 8a | 999 | 66668 | 1688 | 88 |
| 8b | 999 | 66668 | 1688 | 89 |
| 3a | 999 | 66668 | 1699 | 1699 |

TABLE 2 illustrates an exemplary navigation system or iMap to determine the most performance effective path or destination i-Collaborator path (DIP) between two i-Collaborators in an integrated and collaborative computing environment as illustrated by way of example in FIG. 2, in accordance with an embodiment of the present invention. In the present embodiment, the DIP is generated for a cross i-Collaborator request to explicitly list the path between the origination and the destination. The DIP limits the traffic to only the involved i-Collaborators and generally guarantees the fastest delivery with factors such as, but not limited to, the number of interim collaborators, the load of interim collaborators, the communication speed between collaborators, and the effort of format conversions. Since the iMap calculates the DIP in the present embodiment, the community members or usher i-Collaborators do not need to enter any routing information to communicate with other community members and destination i-Collaborators.

TABLE 2

IFA iMAP and DIP
i-Collaborator Map or iMAP: (reference to FIG. 2)

| | Child collaborators | | | | | | |
|---|---|---|---|---|---|---|---|
| Parent collabor | 100 | 20 | 21 | 22 | 13 | 14 | 200 | 300 |
| | 20 | 10 | 17 | 18 | | | | |
| | 21 | 11 | 12 | 13 | | | | |
| | 22 | 14 | 15 | 16 | | | | |
| | 24 | | | | | | | |
| | 10 | 15 | 6 | | | | | |
| | 15 | 10 | | | | | | |
| | 200 | 6 | 7 | 100 | 300 | | | |
| | 6 | 10 | | | | | | |
| | 300 | 8 | 100 | 200 | | | | |

*assuming conversion effort, load and link speed are identical among i-Collaborators
Destination i-collaborator Path or DIP
Case 1: inner tree from 10a to 15b
DIP: 10-20-100(root)-22-15 w/o relative link
10-15 w/relative link 1 0r
Case 2: cross tree from 10a to 6b
DIP: 10-20-100(root)-200(root)-22 w/o foreign link
10-22 w/foreign link 10f In the present embodiment, an i-Collaborator map or iMap is maintained and consolidated by the heads of the network to dynamically reflect the current i-Collaborator relations within the cloud. The iMap is referenced by i-Collaborators to produce a DIP. For example, without limitation, in Case 1 an inner cluster requests a connection from i-Collaborators $10a$ to $15b$, and the DIP is 10-20-head-22-15. However, by adding a relative link $10r$, the DIP can be shortened to 10-15. Similarly, in Case 2, there are cross cluster requests from i-Collaborator $10a$ to i-Collaborator $6b$, and the DIP is 10-20-100 (head)-200(head)-22. However, by adding a foreign link $10f$, the DIP is 10-22. The iMap is the network navigation system. The iMap indicates the connection relation between network entities and therefore prevents any redundant connections, increasing the simplicity and efficiency of the network. The DIP is a pre-defined route; however, the present embodiment also enables dynamic routing when a failure in a connected i-Collaborator is encountered.

The decision to add a relative or a foreign link to shorten the distance can be based on various reasons including, but not limited to, the transaction frequency and volume and the level of security between i-Collaborators. By adding alien links, the i-Collaborators extend the communication channels for their communities to other heterogeneous networks with different implementation methodology. This is one of the flexible features offered by embodiments of the present invention.

When a cluster grows or shrinks, the present embodiment provides methods to retain connectivity. A cluster in an integrated and collaborative computing environment according to the present invention grows in two directions, top down and bottom up. A cluster can grow larger by merging two or more clusters, by sharing the same head or by accepting an insertion of i-Collaborators as the child nodes or clusters as its cluster branches. An i-Collaborator can form a cluster by combining with other i-Collaborators and dedicate one of them as the head. Heads of clusters connect to form a cluster cloud. In the present embodiment, cluster clouds are linked through alien links to form a cloud forest.

A cluster can also shrink when an i-Collaborator is removed from a cluster. When this occurs, the child i-Collaborators adopt the parent of the removed i-Collaborator as their new parent i-Collaborator and the community members of the removed i-Collaborator also connect to the parent of the removed i-Collaborator.

When a cluster grows or shrinks, the iMap is updated and visible by all i-Collaborators. There is no impact or change to the remaining structure, except, in the case of growing, since there are more community members with which to communicate. This is the scalability feature offered by embodiments of the present invention.

In the case of failure of one parent i-Collaborator, the child collaborator is capable of self-healing by adopting the parent of the failed i-Collaborator as the new parent and iMap is updated immediately. In the case of the head of a cluster failing, one of the children is designated to be the guardian to perform the tasks that a head typically performs, until the head becomes available. This high availability/recovery is another feature offered by embodiments of the present invention.

The present embodiment also supports traffic localization. In order to do this, the collaborators involved in the DIP create a dedicated and local traffic of collaborative transactions, and traffic is minimized and only generated on the i-Collaborators along the path. By localizing traffic, the present embodiment provides an efficient way of communication, reduces overall traffic to the minimum, and eases the problems of bottleneck.

The present embodiment supports data privatization and security. Since collaborators are delegated by community members to deliver collaborative requests, community members have options to not physically expose themselves to other business partners. Community members communicate directly by handing the request to their usher i-Collaborators. The requests are forwarded to the connected i-Collaborators, based on the DIP and iMap, which can be the i-Collaborators of parent, children, relatives, or foreign i-Collaborator, or a destination in an alien community, and eventually delivered to the destination. The complexity of the interim architecture is transparent to the community members.

The present embodiment also proposes a software integration and collaboration framework. IFAnet can be applied in software integration and business activity collaboration to unite heterogeneous software and enable all business entities to conduct business as if they were operating under the same software environment. Community members here represent the modules of different software used in each business entity. An i-Collaborator, including, but not limited to, a head, is mainly comprised of an application, a database of online transaction processing (OLTP) and online analytical processing (OLAP), a context aware universal description discovery and integration (UDDI) registry and directory servers to serve as a transactional, operational and analytical repository. Community members do not need to negotiate with each other to come up with any kind of standard format. For each supported collaborative unit of work (UOW), a set of complete business data, community members map once with their usher i-Collaborators' formats and are ready to do business with any other community members; i-Collaborators are responsible for delivering/forwarding the UOW package, based on the iMap, shown by way of example in TABLE 2, to the destination. Community members delegate the usher i-Collaborators to handle collaborative transactions so they are not physically connected to each other. Usher i-Collaborators deliver or forward collaborative UOW requests to the other i-Collaborators indicated in the DIP until the destination is reached. Business partners do not need to physically connect or expose themselves to each other in order to conduct collaborative business activities. This gives business entities security and financial advantages.

The functionalities of these servers comprise the OLTP database saving all the collaborative business activities of its community members and messages/discussion logs via the Collaborative bizCenter, the OLAP database populated by transforming collaborative transactional history data in the OLTP database directly into intelligent statistics to be used by BI-Advisors, the UDDI server registered with the published services from community members and providing On-Demand services with capacities of Context Aware UDDI Lookup which eliminates the unauthorized access attempts to the service providing collaborators; the access requests are checked right at the lookup time at usher i-Collaborators, the LDAP directory server providing the storage for system-wide information including, but limited to, the following: i-Collaborator Map or iMap, constantly synchronizes with the one on the cluster head, Category Structures shared within the same cluster. All the servers with the same cluster share the same category structure for the services and merchant items that their members offer. The head i-Collaborators are responsible for defining the category structure, Category Structure Mapping for inter-cluster transaction, Catalog/Service Items populated by members, Profile Mappings to handle different record format conversion, and Service Access Control Lists.

To implement a software integration and collaboration framework according to the present embodiment, the following elements are introduced for the integration of heterogeneous software for collaborative interoperation between community members and i-Collaborators, and i-Collaborators themselves. The framework also provides a collaborative business messaging system as a business center, bizCenter, where collaborative business activities are initiated, decisions are made, collaborative business activity statistics and history are viewed, aggregated global statistics are available, collaborative business activity flow is automated, and forecasting is offered.

The bizCenter provides a browser based interface for business partners to conduct collaborative business activities directly in their usrher i-Collaborators. It is a web-based Portal consisting of the followings: Business Email systems where business partners discuss and negotiate their transactions, Trading systems where business partners perform collaborative commerce ready searches and conduct business activities, Business Intelligent Dashboards where statistics are available, and Member Administrative Access for members to maintain their operational setting on the usher i-Collaborators, such as, but not limited to, access control lists The framework also offers an infrastructure for a collaborative commerce ready search engine and on-demand service provisioning.

Figure 3:
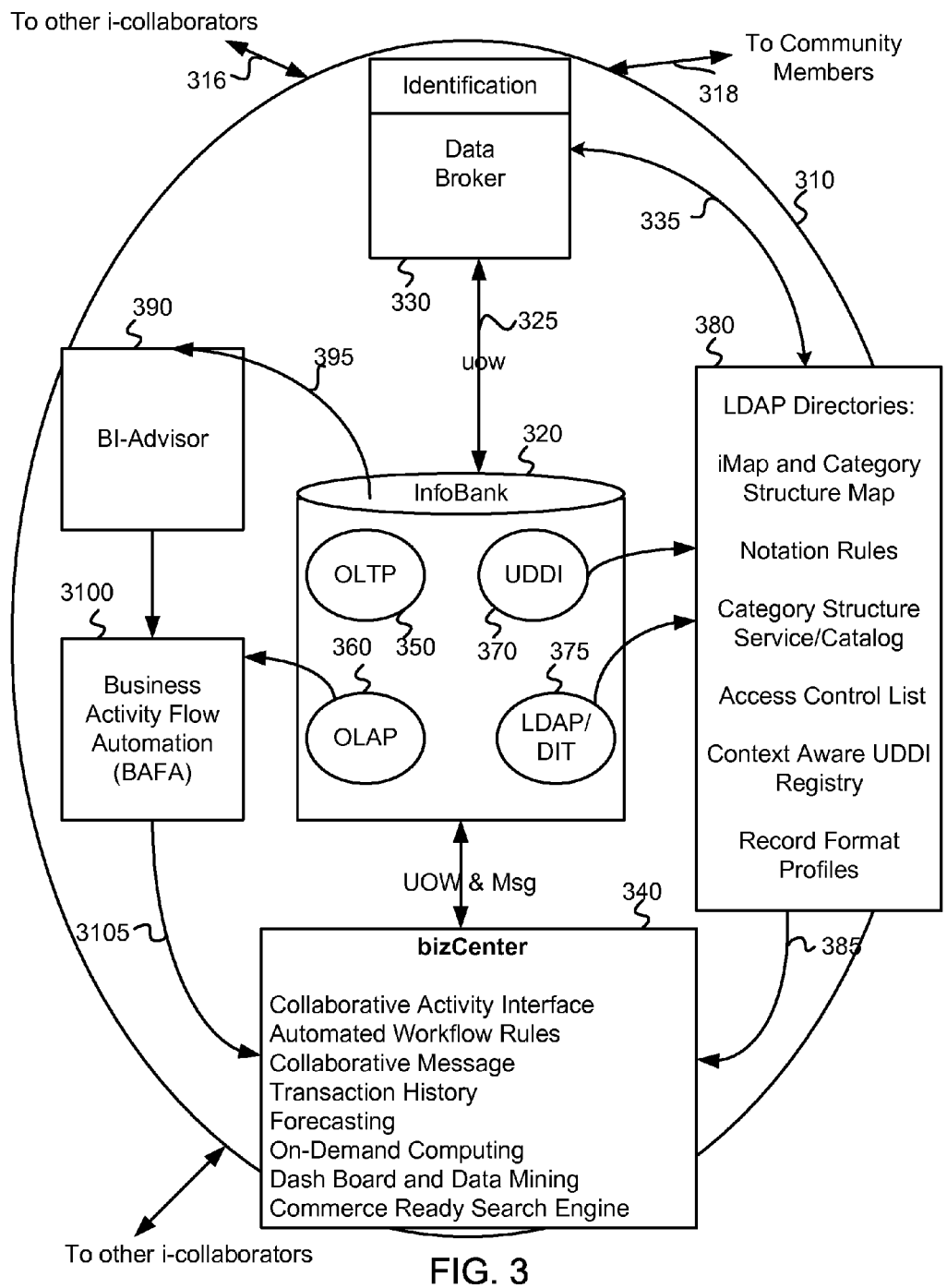
FIG. 3 illustrates the contents of an exemplary i-Collaborator 310 to enable attached community members to communicate with other community members anywhere in an integrated and collaborative computing environment, in accordance with an embodiment of the present invention.

FIG. 3 illustrates the contents of an exemplary i-Collaborator 310 to enable attached community members to communicate with other community members anywhere in an integrated and collaborative computing environment, in accordance with an embodiment of the present invention. In the present embodiment, i-Collaborator 310 has an Information Bank (InfoBank) 320. InfoBank 320 is a repository where all the business activities of connected community members are stored. Business activity information is received into InfoBank 320 through either collection by a data broker 330 from data agents through a link 325 or direct interaction via a bizCenter 340 from end-users. InfoBank 320 provides an OLTP database 350 for storing UOW requests and a messaging log from bizCenter 340, and an OLAP datastore 360 for storing the collaborative business intelligence used by BI-Advisor 390 through a link 395. InfoBank 320 also processes automation rules for a business activity flow automation (BAFA) 3100 connected to bizCenter 340 through a link 3105, a UDDI Registry 370 and a lightweight directory access protocol (LDAP) directory server 375 for storing information in a LDAP directory 380 including, but not limited to published mapping profiles, service and catalog items, and an access control list. LDAP directory 380 transfers information to and from data broker 330 through a link 335 and to bizCenter 340 through a link 385. InfoBank 320 serves as the resource management and operation systems and is synchronized with the head LDAP servers, which serve as central control unit, for other shareable and usable collaborative efforts in this integrated and collaborative computing environment.

In the present embodiment, data broker 330 runs inside i-Collaborator 310. Data broker 330 saves unit of work (UOW) requests for its community members in the server of OLTP database 350, communicates with and forwards UOW requests to the data brokers of connected i-Collaborators through a link 316 in the DIP, and receives from or delivers to the data agents of connected community members through a link 318. Data broker 330 also keeps a pre-mapped profile repository in LDAP server 375. The profile tells which formats of proprietary software are supported in i-Collaborator 310 and is used to convert proprietary formats into the format of the usher i-Collaborator. Data broker 330 provides on-demand services upon requests from data agents. Data broker 330 queries the central service directory in the head i-Collaborator, and renders the results to data agents.

Figure 4:
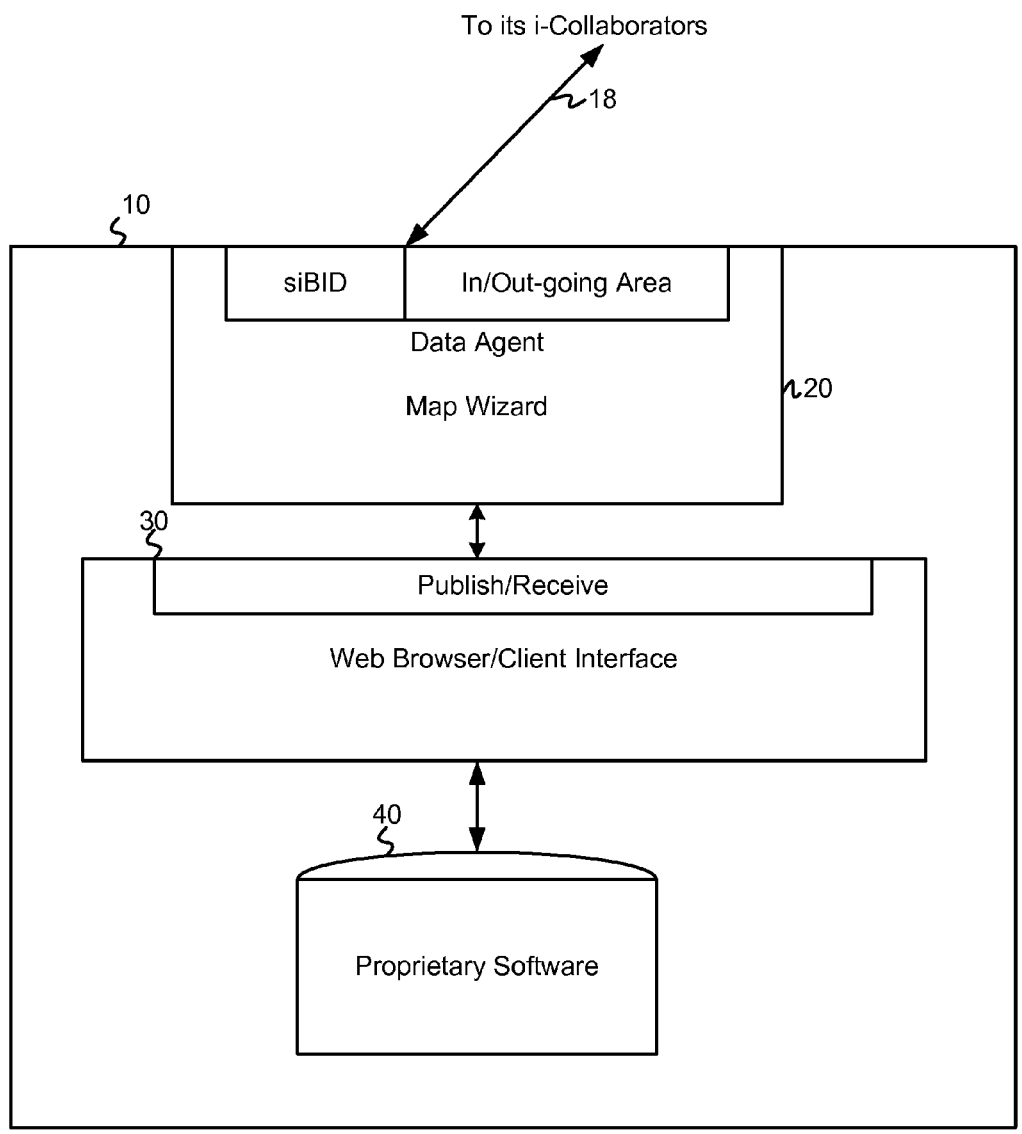
FIG. 4 illustrates the contents of an exemplary community member 410, which connects to an i-Collaborator and participates in an integrated and collaborative computing environment, in accordance with an embodiment of the present invention.

FIG. 4 illustrates the contents of an exemplary community member 410, which connects to an i-Collaborator and participates in an integrated and collaborative computing environment, in accordance with an embodiment of the present invention. In the present embodiment, a data agent 420 runs on community member 410. Data agent 420 guides users to map their UOW formats with the one used in the usher i-Collaborator connected through a link 418 if the formats of the UOW request are not yet supported by the data broker in the i-Collaborator. Data agent 420 prepares and submits the UOW request to the data broker. When data agent 420 receives a UOW request, data agent 420 converts the UOW request to the format of community member 410 and writes the UOW request into a proprietary database 440 of community member 410. Data agent 420 is connected to proprietary database 440 through a client interface 430, and client interface 430.

A collaborative unit of work (UOW) request or a business form is a set of complete data meaningful to both trading partners in an integrated and collaborative computing environment, for example, without limitation, purchase orders or shipping advices, forwarded between i-Collaborators and received between i-Collaborators and community members. Besides the business data, the controlling information guides both i-Collaborators and business partners how to precisely handle the data, as shown by way of example in TABLE 3.

e-Commerce transactions. The format key tells the delivering i-Collaborators what mapping profiles are needed to interpret the receiving data. The format key provides important information for i-Collaborators to set an interim conversion flag whether interim conversions are needed by the interim i-Collaborators along a destination i-Collaborator path (DIP). Data that may be provided in the format key format includes, but is not limited to, attachments, security sections and detailed UOW data. Detailed UOW data is the collaborative business data in the format of the format key.

UOW types indicate the nature of business data that is requested, for example, without limitation, a purchase order (PO) or an invoice. Accents of a UOW provide business partners specifics about the intention of the transaction so that business partners can better understand and correctly process the requests and therefore increase the accuracy and productivity in a collaborative e-commerce environment. The accents enliven a collaborative transaction and make the purposes of that transaction much clearer, for example, without limitation, if the receiving PO is a revision or a cancellation of a previously issued PO. Collaborative processes triggered by integrated and collaborative business activity flow automation (BAFA) to speed up the flow of transactions are based on the pre-defined rules with the types of business activity and the accents.

TABLE 3

| IFAnet Collaborative UOW Package | |
| --- | --- |
| Format Key | Standard ID for current software modules on market, industrial standard formats, e.g., ANSII or EDIFACT, or user defined formats. |
| UOW Type | The type of a Unit Of Work or a supported business form |
| Origination | Community member address or i-Collaborator address |
| Destination | Community member addresses or i-Collaborator addresses |
| Delivery Option: | Point-to-Point: community members |
| Point-to-Point or Broadcast | Broadcast: all community members based on Broadcasting Scopes |
| Broadcasting by Scopes | 1. Destination i-Collaborator only<br>2. Destination Downstream i-Collaborators, if it is addressed to a head node, it is to broadcast to all cluster nodes<br>3. Destination Upstream i-collaborators |
| DIP | Destination i-Collaborator Path - The most efficient path, based on iMAP |
| Interim Conversion y/n Flag | Whether interim i-Collaborators need to perform conversion, in order to make sure the UOW can be recognized by the destination i-Collaborator. If both destination and origination i-Collaborators support the format, mark this field as 'n'. |
| Persistence | Whether or not allowing i-Collaborators to keep a copy of UOW in InfoBank after the delivery completed |
| Accents | The intentions of Unit Of Work (UOW) |
| Attachments | Recovery Count . . . |
| Control Section | |
| Security Section | |
| Detail UOW Data | Data in the Format Key format |

TABLE 3 lists components of an exemplary unit of work (UOW) request carrying business data and controlling information to enliven collaborative activities that is delivered or forwarded between community members and i-Collaborators in an integrated and collaborative computing environment, in accordance with an embodiment of the present invention. In the present embodiment, a format key is a pre-defined and supported standardized ID for current proprietary software on the market or industrial standard format, for example, without limitation, ANSII or EDIFACT, or user defined formats of legacy systems. Mapping against proprietary software formats in the present embodiment enables collaborative business transactions to be conducted directly from proprietary software platforms. The format key provides a way to simplify the record format conversion effort among collaborative Origination and destination spell out the addresses of the community members or the i-Collaborators, depending on the delivery options. In the present embodiment, delivery options include, without limitation, point-to-point, which is used for delivery from community members to community members or i-Collaborators to i-Collaborators, and broadcast, which indicates the delivery is to all community members of i-Collaborators or a group of i-Collaborators based on the broadcasting level by scopes. In the present embodiment, broadcasting levels by scopes can be destination i-Collaborator only, destination downstream i-Collaborators, or destination upstream i-Collaborators.

A DIP or collaborative destination i-Collaborator path is the efficient path based on iMAP. When calculating the DIP, factors such as, but not limited to, the number of interim collaborators, the load of interim collaborators, the communication speed between collaborators, and the effort of format conversions are taking into the consideration. An interim conversion flag indicates whether or not interim i-Collaborators need to perform conversion in order to make sure the UOW can be recognized by the destination i-Collaborator. If both destination and origination i-Collaborators support the format key, interim conversions are not needed. Persistence is a flexible feature of the present embodiment that enables community members to choose whether or not their business data is permitted to be stored in i-Collaborators after the transaction is completed. The sending community member sending the UOW package specifies a persistence control flag, indicating if the data is allowed to be stored in the i-Collaborators.

The present embodiment provides Delivery Tracking which includes, but not limited to, the following delivery statistics: Package Number, Delivery Status, Status Code, Recovery Count, the Last Interim Node handling the delivery, and Alternative DIP for recovery effort, in case of interim i-Collaborator failures.

In the present embodiment, an iMap, derived from the Directory Information Tree (DIT), is maintained and centrally controlled by the head i-Collaborator of a cluster to dynamically reflect the current i-Collaborator relations and is the navigation system to locate community members and i-Collaborators. Community member activities are managed and operated at the usher i-Collaborators. The iMap is referenced by i-Collaborators to quickly produce a DIP and is the network navigation system. It clearly indicates the connection relation between network entities and therefore prevents any redundant connections, thus increasing the simplicity, security and productivity of the network.

When receiving a cross i-Collaborator collaborative request from its serving community members, a data broker queries the iMap and generates a DIP, a path leading to the destination i-Collaborator, based on the iMAP, wraps the request with the DIP and other controlling information in the UOW package, and forwards the UOW package to the next i-Collaborator in the path. When the next i-Collaborator in the DIP receives the UOW request, its data broker either delivers the request to its community member or forwards the request to the next i-Collaborator in the path. In case of unavailability of the forwarded i-Collaborator, a data broker performs the proposed smart recovery and re-calculates the DIP from itself to the destination. The request gets forwarded until it reaches the destination i-Collaborator.

Figure 5:
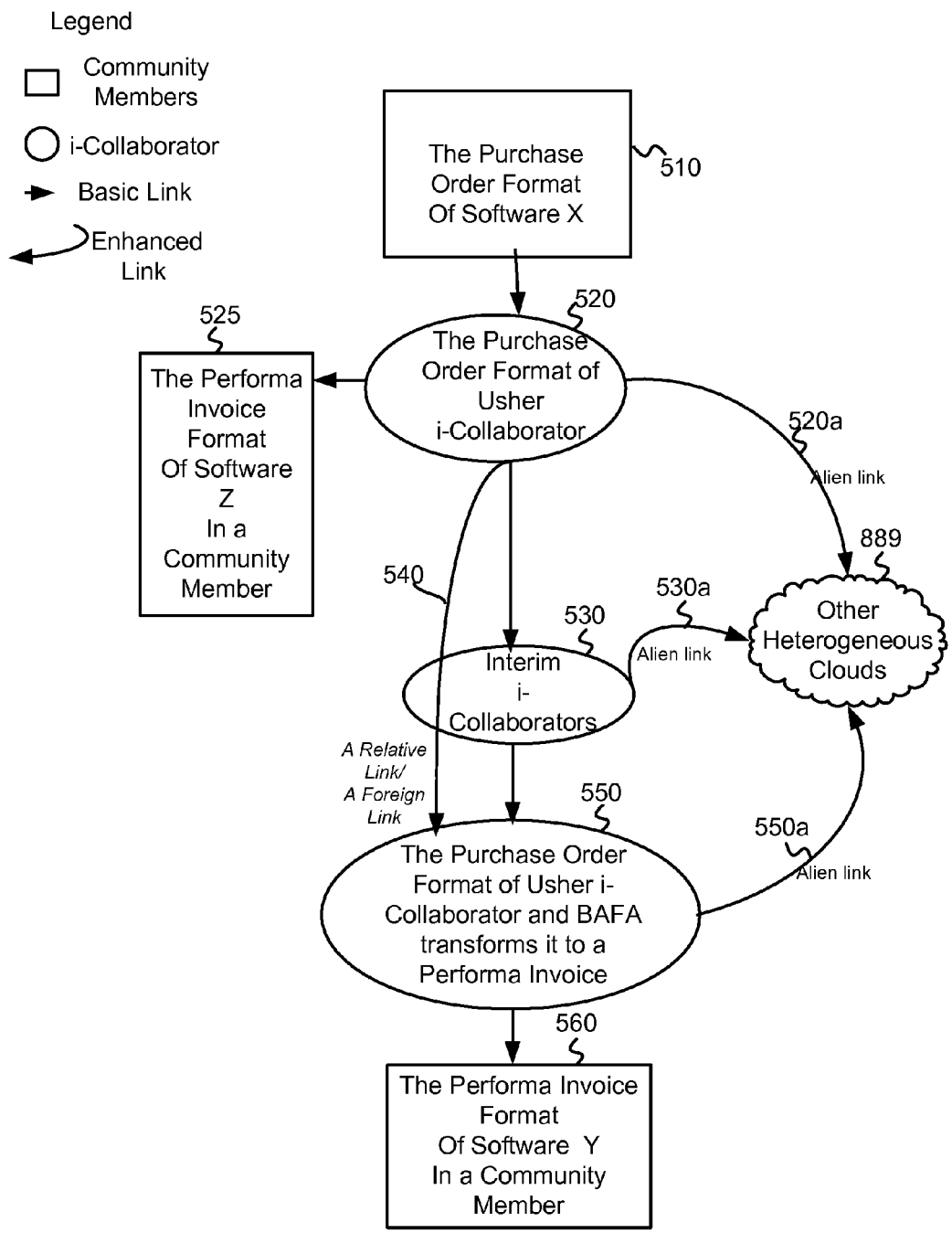
FIG. 5 illustrates an exemplary UOW package delivery flow between business partners via i-Collaborators based on a DIP and UOW package transformation from a purchase order to Performa Invoice with a write once forever method and business activity flow automation in an integrated and collaborative computing environment, in accordance with an embodiment of the present invention.

FIG. 5 illustrates an exemplary UOW package delivery flow between business partners via i-Collaborators based on a DIP and UOW package transformation from a Purchase Order to Performa Invoice, a business form for confirming the received Purchase Order from buyers, with a write once forever method and business activity flow automation in an integrated and collaborative computing environment, in accordance with an embodiment of the present invention. In the present embodiment, a UOW request is initiated from a community member 510 and handled by an i-Collaborator 520, which forwards the UOW request to the next i-Collaborator, either i-Collaborator 530 or i-Collaborator 550 based on the DIP until a destination community member 560 is reached. In the case of cross-cloud requests, the UOW requests are simply forwarded to the contact points of a cloud 889 via alien links 520*a*, 530*a* or 550*a*. There are two types of delivery, point-to-point and collaborator level broadcasting. With point-to-point, the UOW request is sent from one community member and addressed to other community members. With broadcasting, the UOW request is broadcasted to the community members of the addressed i-Collaborators and other i-Collaborators indicated by the field of broadcasting level by scopes.

In the present embodiment, community members invoke a data agent in community member 510. The data agent looks up the address of the destination by sending a request to the directory server of the i-Collaborator of destination community member 560. The i-Collaborator queries the iMAP if the request is not one of its serving members. The data agent wraps the UOW request with header information including, but not limited to, the format key, delivery option, persistence, and origination and destination address of Cloud ID, Cluster ID, global intelligent business identification (giBID) and bizStar intelligent business identification siBID. A giBID is an identification assigned to a collaborative community to uniquely identify itself within a cluster of collaborative business communities. A siBID is an identification assigned to a business entity (bizStar) to identify itself within a collaborative business community, as shown by way of example in FIG. 10. The data agent can perform the conversion to the i-Collaborator's format at this point and use the i-Collaborator's identification for the software/release information, or rely on a collaborator for the conversion. The data agent then notifies the data broker of the UOW request.

The data broker in i-Collaborator 520 receives the UOW request. If the format key is not the same format key of the i-Collaborator, the data broker converts the UOW request to its own format using the corresponding mapping profile for the format key. The data broker saves the UOW request in the information bank. Alternatively, instead of submitting the request from a data agent at the member site, community member users have the option to compose the request directly in i-Collaborators via an integrated and collaborative business activity center, the bizCenter. The data broker notifies the destination community member if the destination is its serving community member 525. Otherwise, the data broker packages the UOW request, adds a DIP based on the iMAP and enters the format key by looking up the format key in the head's LDAP server to see if the destination i-Collaborator supports the format of the request. If so, the UOW request's format is entered and an 'Interim conversion y/n' field is marked 'n' to indicate that no conversion is needed as the package is forwarded by other i-Collaborators before reaching the destination collaborators. If not, the origin i-Collaborator's identity is entered in the format key column and the 'Interim Conversion y/n' filed is marked 'y' so that the package is converted correctly until it reaches the destination i-Collaborator, since every i-Collaborator knows the formats of its direct-connected i-Collaborators with either parent/child links, relative links, or foreign links, or an alien entity. The data broker then notifies the next i-Collaborator in the path. The next i-Collaborator may be a parent/child, relative or foreign i-Collaborator.

Next, a data broker in interim i-Collaborator 530 receives the UOW request. If 'Interim conversion' is needed, the data broker converts the UOW request to its own format based on the mapping profile for the format key and the data broker updates the UOW request with its own identity on the format key column. Otherwise, the UOW request is forwarded to the next i-Collaborator in the DIP. Then the data broker notifies the next i-Collaborator in the path. Again, the next i-Collaborator may be a parent/child, or an i-Collaborator of a relative or foreign link 540, or an alien entity.

Next, the data broker of destination i-Collaborator 550 receives the UOW request. The data broker determines that the destination is one of its community members and converts the UOW request to its own format based on the mapping profile for the format key and saves the UOW request in the information bank. BAFA transforms the UOW request to Performa Invoice and other work flows, based on the Work Flow rules for the type of UOW request, the business partner, and the intention or the accents. The data broker notifies destination community member 560, and the community member users have an option to work on the UOW request via an integrated and collaborative business activity center. Once done, the UOW request is ready to be received by the data agent of destination community member 560.

Once the data agent of destination community member 560 receives the UOW request, the data agent converts the Performa Invoice to the proprietary format of destination community member 560. Users may click on receive and receive the UOW request into their working environment, work on the UOW, and save the UOW into the proprietary database of destination community member 560.

Figure 6A:
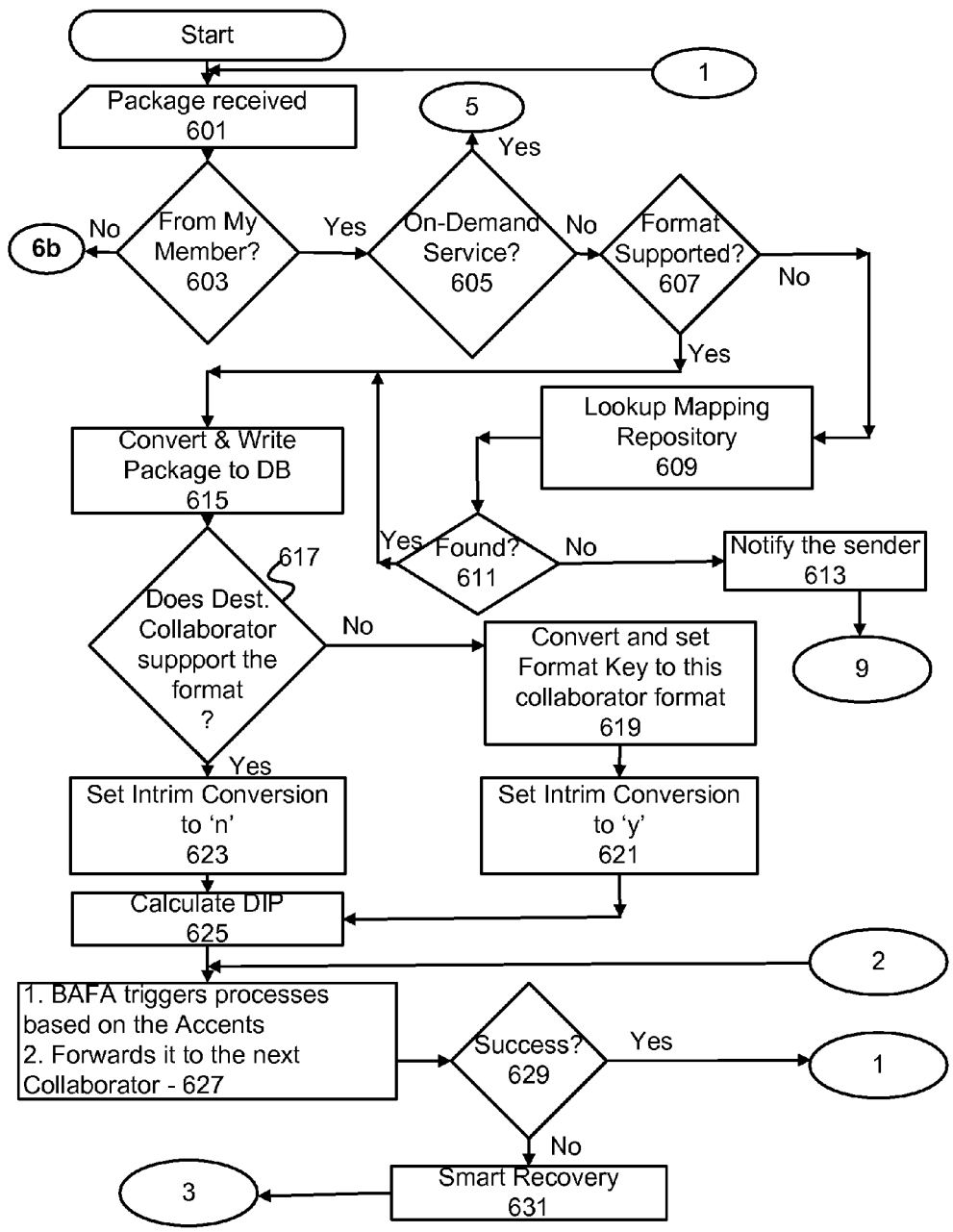
Figure 6B:
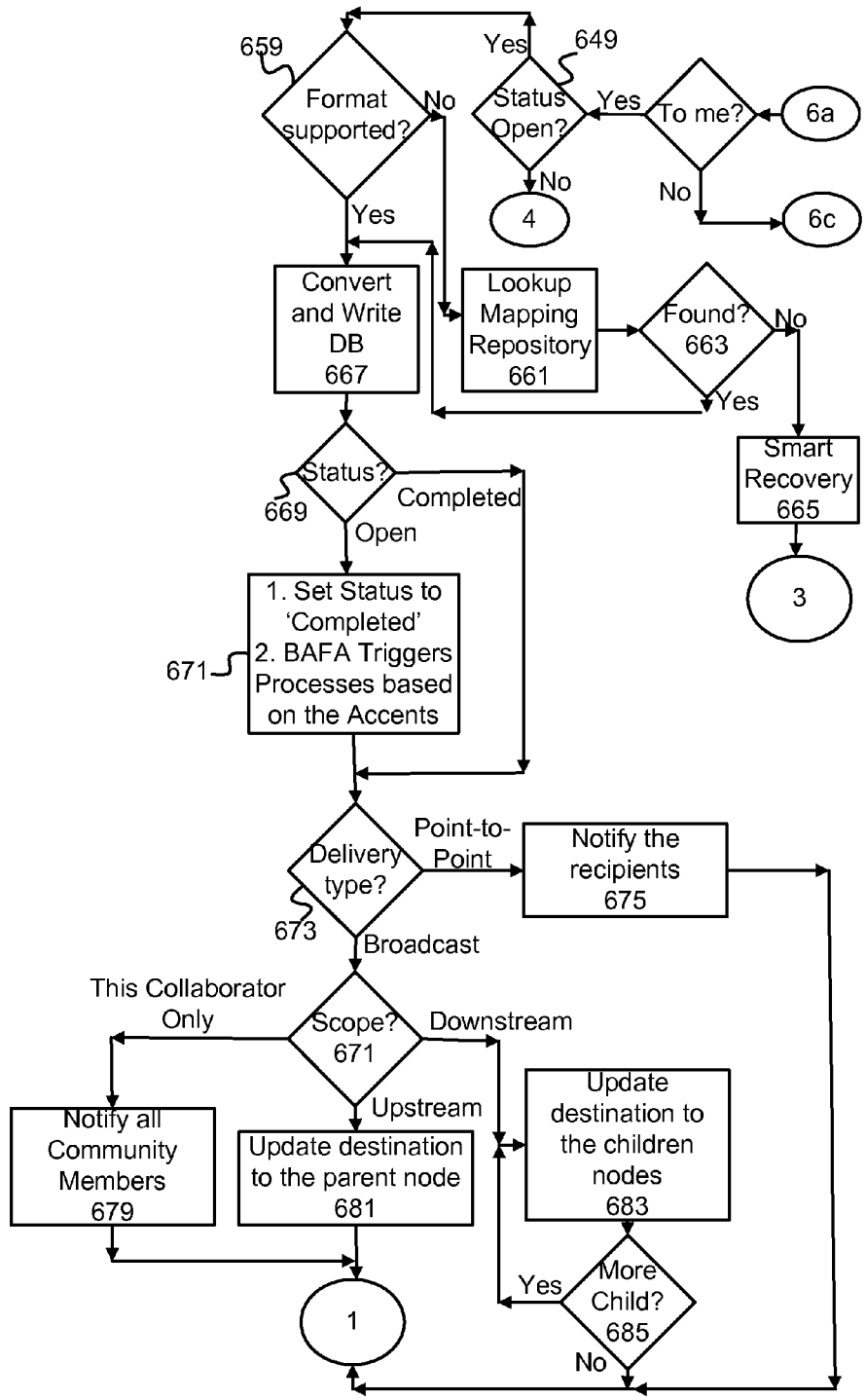
Figure 6C:
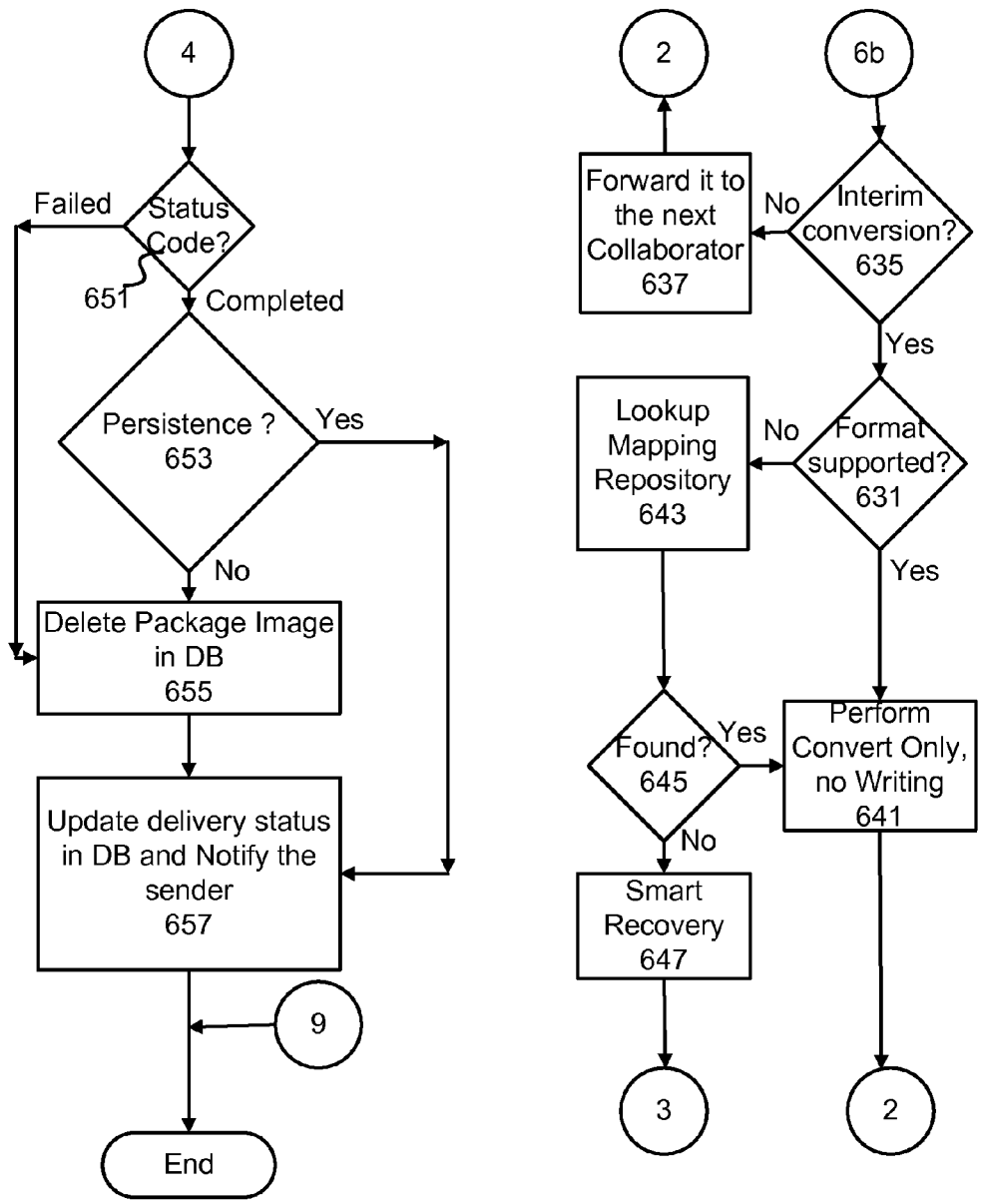
Figures 1, 6:
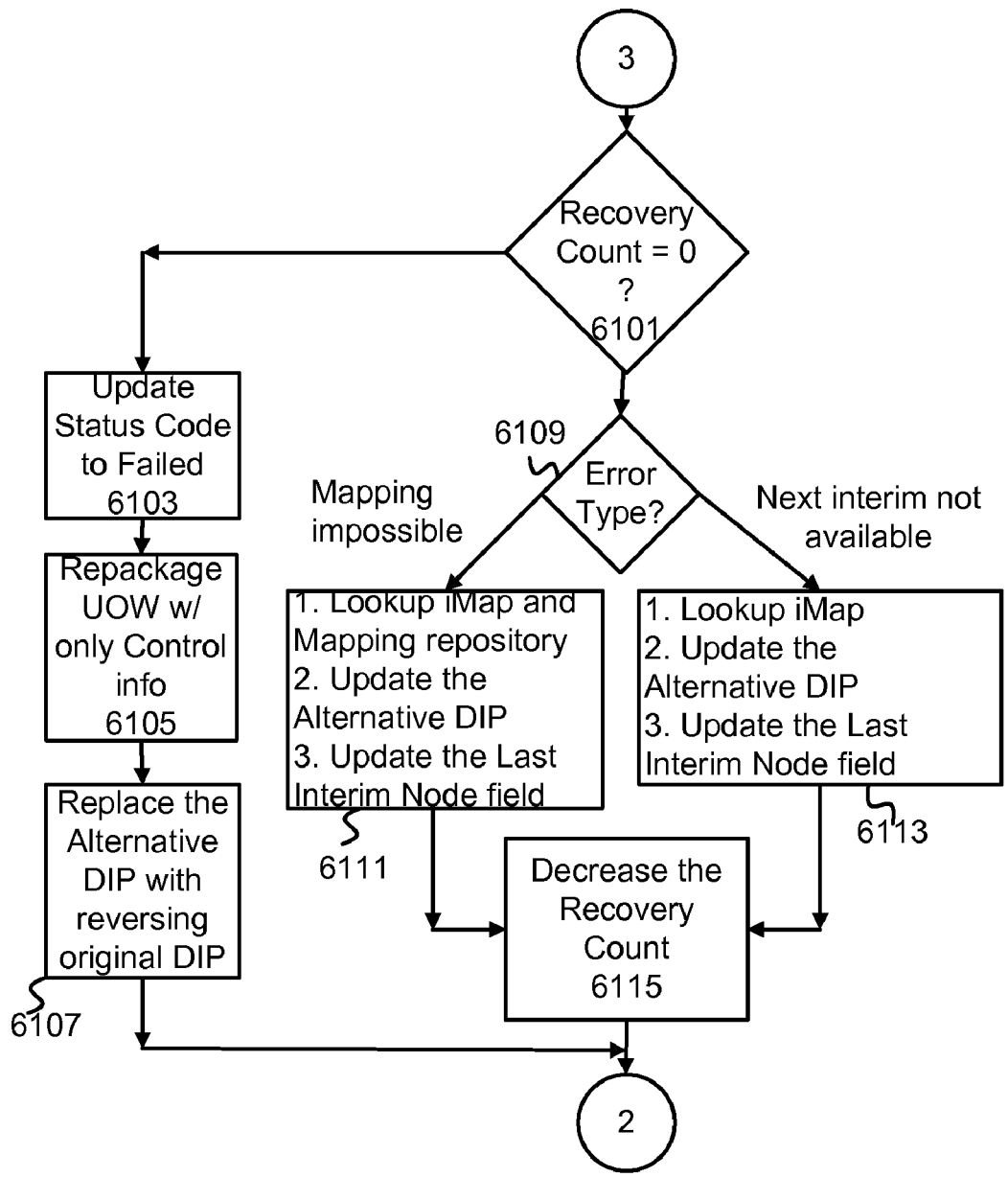
Figures 2, 6:
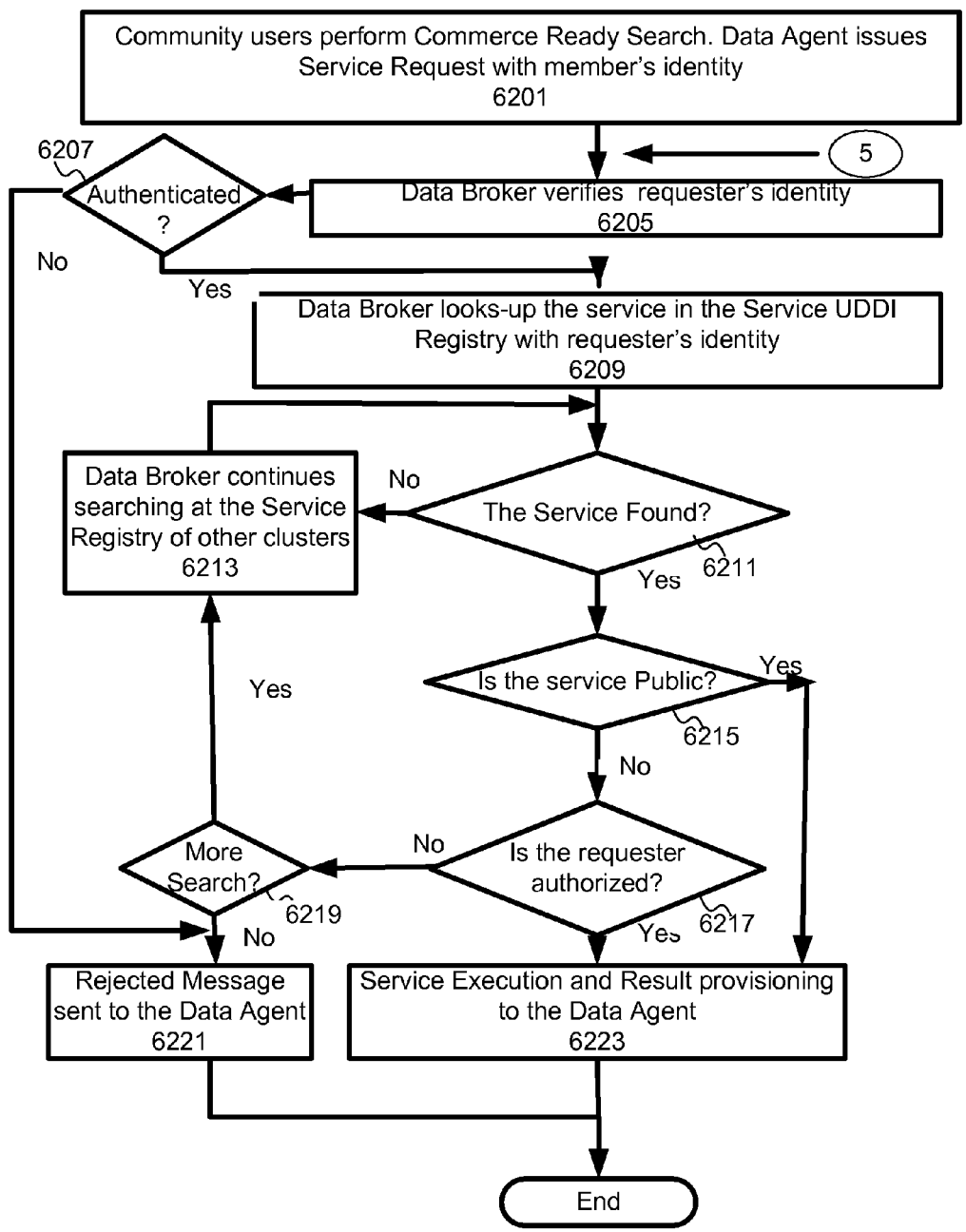

FIGS. 6a, 6b, 6c, 6-1 and 6-2 are flow charts illustrating an exemplary flow control of UOW delivery, including collaborative point-to-point and broadcasting-by-scopes transactions, on-demand service provisioning, delivery smart recovery, and persistence handling in an integrated and collaborative computing environment, in accordance with an embodiment of the present invention. FIGS. 6a, 6b, and 6c illustrates the comprehensive flow control, FIG. 6-1 illustrates the portion of delivery smart recovery of the IFAnet flow control process, and FIG. 6-2 illustrates the logic flow of on-demand service provisioning. To start the process in the present embodiment, a package is received in step 601. Then in step 603, it is determined if the package is from a community member. If so, it is determined in step 605 if on-demand service is requested. If so, the process continues to a checkpoint 5, which is the beginning of the on-demand service provisioning process shown by way of example in FIG. 6-2. If on-demand service is not requested, the process goes to step 607 to determine if the format of the package is supported. If not, the format of the package is searched for in a globally shared format-mapping repository in step 609. If the format of the package is not found in step 611, the sender is notified that format of the package is not supported, and the process continues to a checkpoint 9, which ends the process.

If the format of the package is determined to be supported in step 607 or found in the mapping repository in step 611, the process continues to step 615 where the package is converted and written to the database of the receiving entity. It is then determined in step 617 if the destination usher i-Collaborator supports the format of the package. If not, the package is repackaged in step 619 and an interim conversion setting is set to "y" in step 621. If the destination usher i-Collaborator supports the format of the package in step 617, the interim conversion setting is set to "n" in step 623.

After the interim conversion setting is set, the process calculates the DIP in step 625. Then in step 627, the BAFA triggers processes based on the accents of the package, and forwards the package to the next i-Collaborator. It is determined if step 627 is successful in step 629. If so, the process continues to a checkpoint 1, where the process advances to the next i-Collaborator in the DIP. If not, the process initiates the smart recovery process in step 631, which starts at a checkpoint 3 and is shown by way of example in FIG. 6-1.

If, when the package is received, it is determined in step 603 that the package is not from a community member, the process goes to step 633 where it is determined if the receiving entity is the intended recipient. If not, it is then determined in step 635 if interim conversion is necessary. If not the process continues to step 637 where the package is forwarded on to the next i-Collaborator. The process then proceeds to a checkpoint 2, which returns the process to step 627.

If interim conversion is necessary, it is determined if the format of the package is supported in step 639. If so, the package is converted without being written to a database in step 641, and the process continues on to checkpoint 2. If the format is not supported in step 639, the format is searched for in the mapping repository in step 643. It is determined if the format of the package is found in the mapping repository in step 645. If so, the process continues to step 641. If not, the process initiates the smart recovery process, shown by way of example in FIG. 6-1, at step 647 beginning at checkpoint 3.

If in step 633 the package is intended for the recipient, it is determined if the status of the package is open in step 649. If the status is not open, the process continues to a checkpoint 4, which begins a persistence handling process. In this process it is determined in step 651 if the status code of the package is failed or completed. If the status code is completed, it is determined in step 653 if persistence is enabled. If not, the package is deleted from the database in step 655. If persistence is enabled in step 653 or after the package has been deleted in step 655, the process updates the delivery status of the package in the database and notifies the sender in step 657, and the process is complete. If in step 651 the status code of the package is failed, the process skips forward to step 655.

If in step 649 the status of the package is open, it is determined in step 659 if the format of the package is supported. If not, the format of the package is searched for in the mapping repository in step 661. It is determined if the format of the package is found in step 663. If not, the process initiates a smart recovery process, shown by way of example in FIG. 6-1, at step 665 beginning at checkpoint 3. If the format of the package is found in step 663 or if the format is supported in step 667, the package is converted and written to the database of the receiving entity in step 667. Then, in step 669, it is determined if the status of the package is completed or open. If the status is open, the status is set to the status of being completed and the BAFA triggers processes based on the accents of the package in step 671. After this step, or if the status of the package is set to the status of being completed in step 669, the delivery type of the package is determined in step 673.

If the delivery type is point-to-point, the recipients are notified in step 675, and the process returns to the start point. The notifications are both to data agents and message to the Integrated and Collaborative Business Activity Center (biz-Center). If the delivery type is broadcast, the scope of the delivery is determined in step 677. If the scope is for the recipient only, all community members are notified in step 679, and the process continues to checkpoint 1, which returns the process to the start point. If the scope is upstream, the destination of the package is updated to the parent node in step 681, and the process continues to checkpoint 1. If the scope is downstream, the destination of the package is updated to the child nodes in step 683. It is then determined in step 685 if there are more children. If so, the process returns to step 683. If not, the process continues to checkpoint 1 to restart the process.

FIG. 6-1 illustrates an exemplary delivery smart recovery process, in accordance with an embodiment of the present invention. In the present embodiment, the process begins at checkpoint 3, shown by way of example in FIG. 6. Then in step 6101 it is determined if the recovery count is zero. If so, the status code of the package is updated to failed in step 6103. Then the package is repackaged with control information only in step 6105. Then, in step 6107, the alternative DIP is replaced with a reversal of the original DIP. Then the delivery process continues to checkpoint 2, as shown by way of example in FIG. 6.

If the recovery count in step 6101 is not zero, the type of error that occurred is determined in step 6109. If the error is that mapping is impossible, the process goes to step 6111. In step 6111 an alternative path is formed by weighting the distance and the conversion effort. Once determined, the alternative DIP is updated, and the last interim node field is updated with the newly determined i-Collaborator. If the error in step 6109 is that the next interim is not available, the process goes to step 6113. In step 6113 an alternative path is formed by weighting the distance and the conversion effort. Once the path is determined, after either step 6111 or 6113, the process continues to step 6115. In step 6115, the recovery count is decreased by one. Then the process continues to checkpoint 2, as shown by way of example in FIG. 6.

FIG. 6-2 illustrates an exemplary on-demand service provisioning process, in accordance with an embodiment of the present invention. In the present embodiment, the process begins in step 6201 where a community user performs a commerce ready search, and a data agent issues a service request with the identity of the community member. Then the process shown by way of example in FIG. 6 connects to the process at checkpoint 5. Then in step 6205, the data broker verifies the identity of the community member requesting a service. It is determined in step 6207 if the identity of the community member is authenticated. If so, the data broker looks up the service that is requested in the service UUDI registry with the identity of the requesting community member in step 6209. It is then determined in step 6211 if the service is found. If not, the data broker continues to search service registries of other clusters in step 6213, and the process continues to return to step 6211 until the service is found. Once the service is found in step 6211, it is determined in step 6215 if the service is free and available for public access. If not, it is determined if the requesting community member is authorized in step 6217. If not, it is determined in step 6219 if more searching is required. If so, the process returns to step 6213. If not, the process continues to step 6221 where a rejected message is sent to the data agent, and the process ends. If in step 6217 the requesting community member is authorized, a service execution and result provisioning is sent to the data agent in step 6223, and the process ends. If in step 6215 the service is public, the process continues to step 6223. If in step 6207, on the other hand, the requesting community member is not authenticated, the process proceeds to step 6221 to reject the request, and end the process.

The present embodiment comprises a Map Once for All feature to greatly reduce the record mapping of exchanged collaborative business requests. The present embodiment provides a method for heterogeneous software to communicate and for proprietary data/record formats to be exchanged, without undergoing tedious data conversion or direct connections. The present embodiment proposes to map directly with existing software on the market and industrial standard format, such as, but not limited to, ANSI or EDIFACT, used by the community members and the formats used by the i-Collaborators; furthermore, all the mapped profiles are published for sharing within the proposed integrated framework architecture. Conversion procedures are greatly simplified; because once a proprietary format is adopted by one i-Collaborator and published, the mapping profile is utilized by all of the i-Collaborators with the same format to serve their community members who are using that particular format. This is what the Map Once for All feature offers. Using the present embodiment, there may be one format mapping needed for a community member or a business entity to communicate with its trading partners, if it is the first time the format is introduced into the cluster. Since community members communicate to the network via usher i-Collaborators, community members should map their proprietary format with their usher i-Collaborators' formats, and since connected i-Collaborators know how to handle each other's formats. Therefore, community members are able to conduct collaborative business with any community member within the network. An i-Collaborator provides a set of pre-mapped profiles for various unit of work (UOW) packages to support most of the current popular software formats and industrial standards and provide a mapping tool that a data agent can use to create mapping profiles for non-supported formats. In the present embodiment, the mapping tool is capable of reading the custom database metadata, comparing the metadata with the format of the usher i-Collaborator, making recommendations, and validating the mapping. Once the mapping is approved by the usher i-Collaborator, the data broker publishes the mapping to the head mapping profile repository. Once published, the mapping profiles are available for other community members who are using the same format.

In the present embodiment, a pre-mapped profile repository in the head node is shared and maintained by every i-Collaborator in the same cluster and every data broker carries a copy of the profile repository to serve its community members and updates the profile repository whenever a new mapped profile is created by one of its data agents. The status of what formats are supported by an i-Collaborator can be queried by other i-Collaborators via its directory server. Upon getting this status, the interim conversion y/n field in the UOW package can be set accordingly by the origination i-Collaborator. This field tells the interim i-Collaborators listed in the DIP whether or not the conversion is needed when they receive the UOW packages before forwarding them. If the destination i-Collaborator can support the format of a UOW request, the maximum number of conversions is two, one on the origination i-Collaborator and another one on the destination i-Collaborator, eliminating the need of conversion during forwarding processes by the interim i-Collaborators.

The present embodiment also comprises a write once forever feature. For each instance of business activity, data prepared and submitted by the original requester is used throughout every phase of business activity. For example, without limitation, a BAFA uses a buyer's purchase order data to convert to a seller's Performa invoice and the seller's vendor POs, and then convert the Performa Invoice data to shipping advices and invoices for the buyer, and so on. This helps to not only generally eliminate redundant work in a collaborative transaction environment but also increases the accuracy of the data integrity between the interactions of business partners. The same data is also transformed into OLAP data used by a BI-Advisor to provide community member users with integrated business intelligent metrics, by which business partners can better understand their business and better plan for the future. The same data also serves as the discussion topics between business partners as they negotiate during their daily interaction using the integrated and collaborative business activity center, bizCenter, the central place used by business partners to conduct collaborative business activities directly connecting to the usher i-Collaborator online. The present embodiment generally ensures that business data is only written or prepared once and can be utilized during every phase of a business cycle to generally guarantee the operation efficiency and data integrity.

The present embodiment provides collaborative business activity flow automation (BAFA) and a business intelligent advisor (BI-Advisor). Since all the activities are stored in the InfoBank, the BI-Advisor can create patterns of an entity's business activities and provide intelligence to help community members with conducting business and making decisions. Using the BI-Advisor, business work flows can be generated to carryout business activities automatically. The BI-Advisor can also recommend the best practice for a particular activity. BAFA records some common business flows. For example, without limitation, when a purchase order (PO) is received by a seller, the BI-Advisor consults with BAFA for the next business activity after a PO is received, and a Performa invoice (PI) is created. The seller can review and edit the PI and its vendors' POs in the bizCenter and then optionally receive the PI and vendor PO into the proprietary system of the seller to work on or save a copy in its own database. Once the PI is approved, the next activity with consultation from BAFA is triggered. BAFA also utilizes the UOW accents to properly trigger pre-defined collaborative activity flow and conduct collaborative business activities automatically. With the help from BAFA, the BI-Advisor and using the bizCenter as a message exchange media, the flow of collaborative business activities between business partners is smooth and swift.

Another task of the BI-Advisory according to the present embodiment is to generate aggregated metrics within its cluster domain to support community member and cluster-wide market statistics requests. Statistic reports and charts are generated to depict the condition of an entity. This is a collaborative effort supported by all the business partners to help the success of each business. This is another unique feature offered by the present embodiment that local statistics provided by cluster i-Collaborators can easily and quickly be consolidated by a BI-Advisor into global statistics for its community members. With the accents or intents in UOW and the business intelligence provided by the BI-Advisor, BAFA not only guides the transformation of business UOW forms, it also offers a tool to enable collaborative business activities be configured so that a larger scope of activity groups can be accomplished. An i-Collaborator can implement a service list comprising all service offered by community members with the same category structures shared by other i-Collaborators. In the present embodiment, the same category structure is essential for any statistics metrics used by the BI-advisory for any global domain analysis.

In the present embodiment an integrated and collaborative business activity center or bizCenter provides a central place and a convenient and fast way for decision makers to perform or view their business activities with transactional histories. The decision makers may also approve or reject a business request with comments attached, without the need to access particular software, particular page or look for a particular request.

The bizCenter is an integrated and collaborative business messaging system that tracks business activities between business partners. There are unique aspects about the bizCenter according to the present embodiment, including, but not limited to, the following. Via the bizCenter, UOWs are allowed to be entered directly into the i-Collaborator by its authorized community member users. The bizCenter provides a one-click-to-set-role for a user to indicate the type of role the user wants to be, for example, without limitation, a provider (sell) or consumer (buy). By knowing the role, a proper working mode is set. For example, without limitation, under buying mode, the types of UOW packages are limited to, for example, without limitation, sample requests, quotation requests, or purchase orders. While under selling mode the types of UOW packages may be, for example, without limitation, samples, quotes, Performa invoices, shipping advices, or invoices. What makes the present embodiment of the bizCenter unique is that direct-entered UOW packages can be easily received into a proprietary software system with a one-click-receive and preserve the concept of the write once forever feature. The system can be used as the end users' sole trading system, if desired. BAFA provides automated flow control to streamline collaborative business process flow.

In the present embodiment, the bizCenter directly links to collaborative business activities. The recipients can perform various types of operations on the messages to trigger the next step of collaborative processes. For example, without limitation, a community member can approve a purchase order with a one click approve function, reject the PO with a one click to reject function, convert the PO with a one click convert function, or publish the PO with a one click publish function to trigger the pre-defined collaborative activities.

The bizCenter provides history trace of any business activity occurring within i-Collaborators, and presents all the related messages that have been completed for a particular business activity. After all, the bizCenter is an integrated business messaging system. With the BI-Advisor and BAFA, the bizCenter provides a system where collaborative business activities may be initiated, decisions may be made, collaborative business activity statistics and history may be viewed, aggregated global statistics may be provided, business activity flow may be automated and forecasting may be offered.

The preferred embodiment of the present invention provides an excellent framework for on-demand service provisioning. The sources of the services are transparent to the requesters. Community members request services from an i-Collaborator, and the i-Collaborator lookup, authenticates, executes and provisions the services to the community members. The i-Collaborator provides the infrastructure and functionalities from which any service offered by any community member can be swiftly identified through service registry, executed, and provisioned to the needs of authorized requesters, as shown by way of example in FIG. 6-2

The preferred embodiment of the present invention provides commerce ready search engine where business partners and the services or merchants they offer are represented by their global unique identifications. By knowing the exact addresses and items, collaborative business activities can be initiated right at the results page.

The engine comprises browser pages where member users select a scope of search: local, cluster-wide or inter-clustered communities, enter service/merchant inquires, navigate the searched results and initiate business activities, programs in usher i-Collaborators that parse search criteria, retrieve matched records using proper database indexes, and communicate with the cluster heads if it is a cluster level search. Since the category structures are shared with the same cluster, the same search query can be sent to the head for a cluster wide search, the Category Structure Maps that map between clusters' category structures for inter-cluster transaction, programs in cluster heads that parse search queries, retrieve matched records using proper database indexes can communicate with the other cluster heads to forward the search query, receive results from them, and forward the results to the calling programs if they are inter-cluster searches. Since the category structures are not necessarily shared among different cluster communities, the search query may need to be translated using the category structure maps before they are sent to other cluster heads, and programs that interact with the message delivery modules within i-Collaborators which collaboratively transport overall business transactions within the communities.

Figure 7:
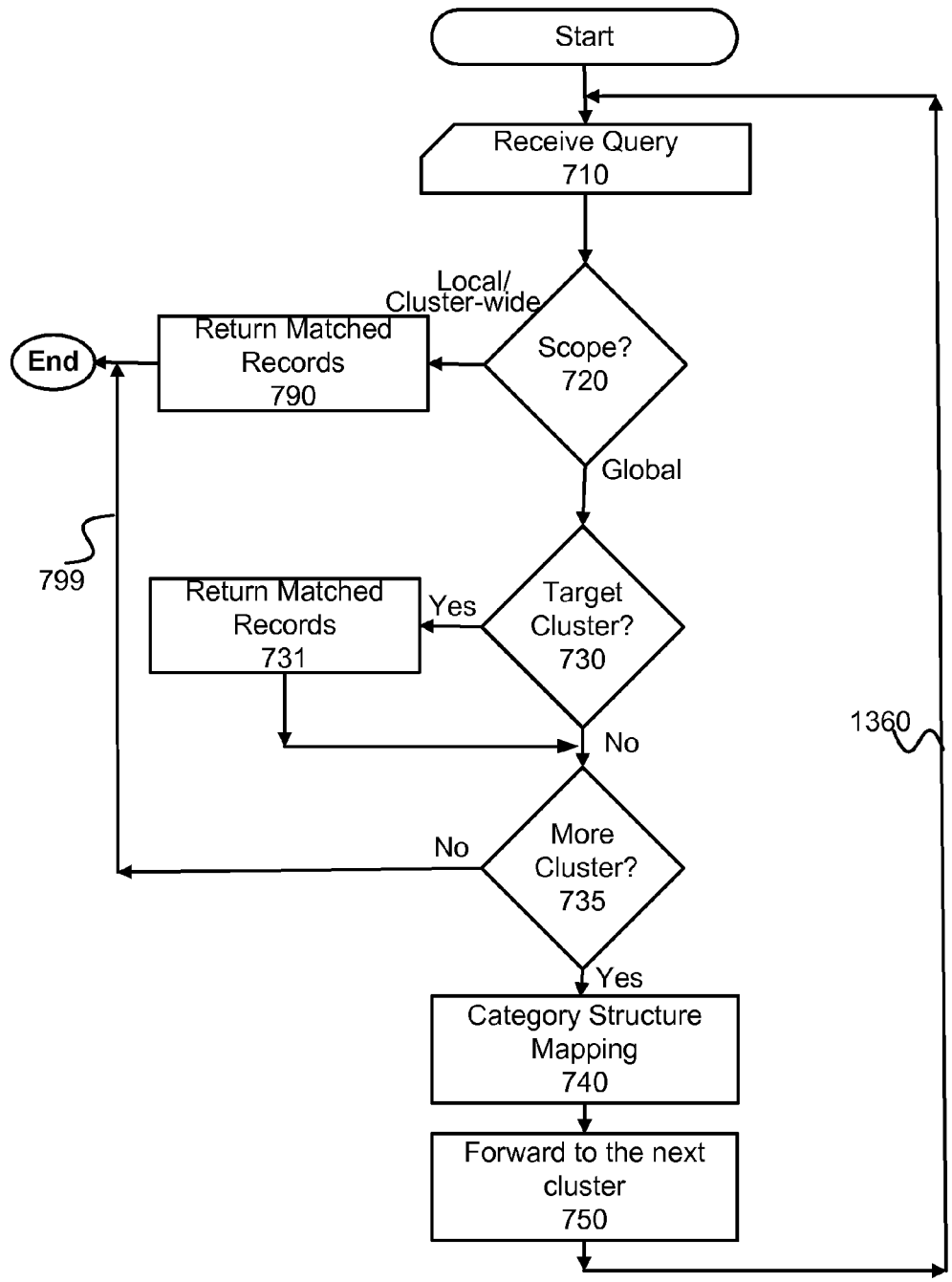
FIG. 7 illustrates an exemplary logic flow of a commerce ready search result provisioning process in an integrated and collaborative computing environment, in accordance with an embodiment of the present invention.

FIG. 7 illustrating an exemplary flow control of a commerce ready searching method. To start the process in the present embodiment, a search query is received by a collaborator 710. Then in step 720, it is determined if the scope of a query is local only, meaning the community the requester belonging to. If so, an usher i-Collaborator returns the matched records among its community to the requester 790. If the scope is cluster-wide, a cluster head collaborator returns the matched record among its cluster to the requester 790. If the scope is global, it is further determined that if the receiving collaborator is the target 730. If so, a cluster head collaborator returns the matched record among its cluster to the requester 731. If not and if there are more clusters to inquire 735, a receiving cluster head collaborator performs category structure mapping 740 and forward the query with mapped structure to the next head collaborator in the address sequence 750. The flow continues 760 until there are no more clusters to inquire, which ends the flow 799.

Figure 8:
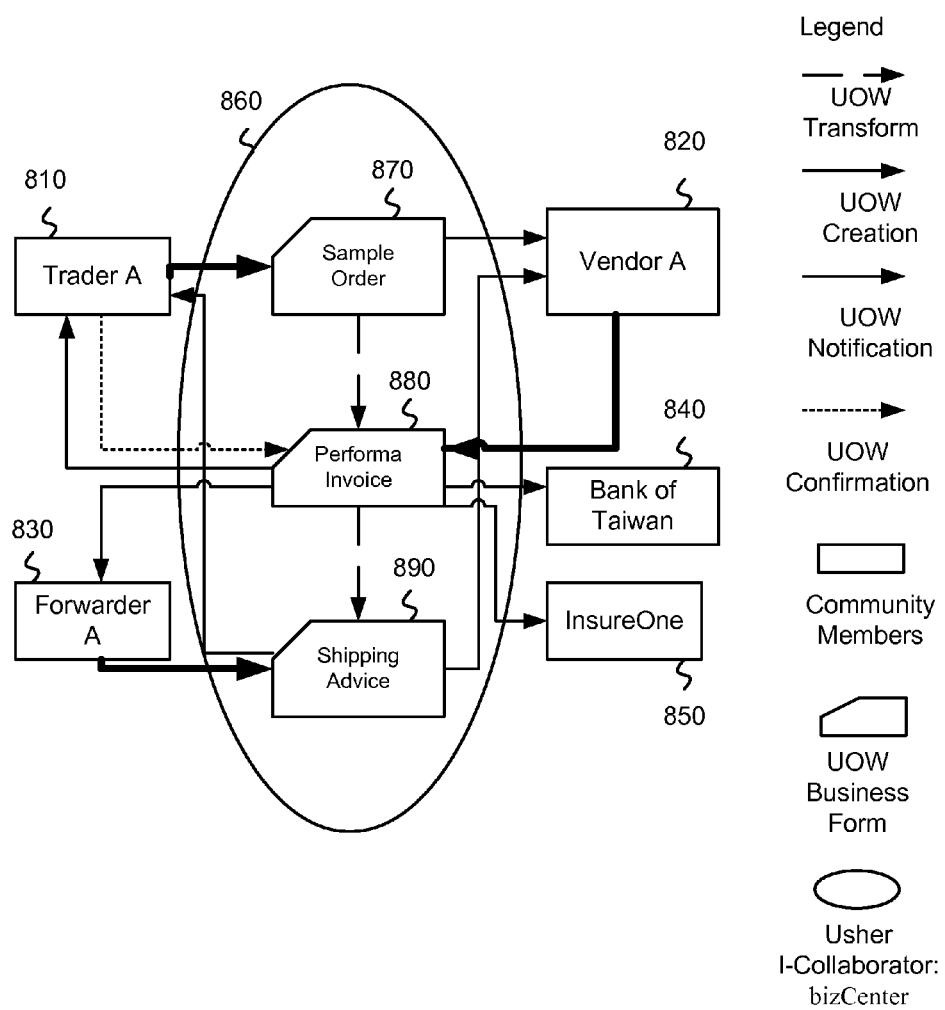
FIG. 8 illustrates an exemplary collaborative e-commerce flow using an integrated and collaborative business activity center (bizCenter) and integrated and collaborative business activity flow automation (BAFA) in an integrated and collaborative computing environment, in accordance with an embodiment of the present invention.

FIG. 8 illustrates an exemplary collaborative e-commerce flow using an integrated and collaborative business activity center (bizCenter) and integrated and collaborative business activity flow automation (BAFA) in an integrated and collaborative computing environment, in accordance with an embodiment of the present invention. In the present embodiment, a user, Trader A 810, in an International Traders community connects to a network via an usher i-Collaborator 860 and is authenticated. In the present example, Trader A 810 wishes to perform a business task, for example, without limitation, purchase baby strollers for his customers. To begin, Trader A 810 wants to search what is available, so he performs a commerce ready search.

Trader A 810 navigates through appropriate categories within the search and gives more specific criteria and receives a list of strollers available from many vendors for purchase. Behind the scene, collaborative item/service directories are searched, and the results are rendered by BAFA. After viewing the results, Trader A 810 decides to select ten items belonging to three different companies. Also, Trader A 810 wishes to receive samples and receive quotes from the three companies by checking the appropriate boxes on the research result page of the user interface, and the UOW requests for sample orders and quote requests are generated and addressed to the selected companies by usher i-Collaborator 860.

Trader A 810 works on each UOW request for detailed specifications; among other things in the present example, Trader A 810 selects a Forwarder A 830 as the forwarder, a bank, Bank of Taiwan 840, to issue a letter of credit (LC), Sea Liner as the freight company, and an insurer, Insure One 850, as the insurance carrier. Since the items on the search result contain information needed for creating UOW requests, including, without limitation, the addresses and IDs of vendors, the delivery is guaranteed by usher i-Collaborator 860 and a selected vendor, Vendor A 820, receives the UOW requests.

There may be several discussions on the orders between Trader A 810 and Vendor A 820 via the integrated and collaborative business activity center. All of the messages are linked to a specific UOW request and become an important business transaction log, which the bizCenter provides when requested. Then Vendor A 820 completes a Performa Invoice 880, converting from a sample order 870 with business activity flow automation (BAFA). Trader A 810 is then notified and confirms the receipt of Performa Invoice 880. At this time, all business partners involved in the UOW request are notified, Vendor A 820, Bank of Taiwan 840, InsureOne 850, and Forwarder A 830 in the present example.

When Vendor A 820 is ready to ship the samples to Trader A 810, Forwarder A 830 initiates another activity with Sea Liner for shipping the order and then completes a shipping advice 890 with BAFA. Again, Trader A 810, Vendor A 820, Bank of Taiwan 840, and InsureOne 850 are notified with shipping advice 890. At this time, Bank of Taiwan 840 initiates an LC transaction with Bank of Universe, the bank Vendor A 820 uses, regarding the payment arrangement for this order. Also, upon receiving the confirming shipping order 890 from Vendor A 820, SeaLiner initiates a UOW request for invoicing Vendor A 820 for the shipping service, which in turn may trigger another UOW request between banks for a payment arrangement. All of the subsequent business activities are linked directly or indirectly to the original sample order 870 within the integrated and collaborative business activity center.

Trading partners may be located in different i-Collaborators of different clusters; however, the inter-i-Collaborator communication enables all the business partners to perform business activities as if they were working under the same environment.

With the IFAnet architecture of the preferred embodiment in mind, a community member is logically equivalent to a software module, procurement or account payable used by a business partner. An i-Collaborator or a collaborative unit represents a local economy community with some special business interests in common, for example, without limitation, Banking or Government, or may be a company or enterprise. A cluster might be another way of grouping a larger scope of communities. A cluster cloud can be an even larger scope of business domains that encompass more business entities and represent certain types of organization globally. However, the integration scope of IFAnet is user-defined in that it can be implemented at different scopes such as, but not limited to, of a department, a company, an enterprise, regional economic communities or globally, and yet various user-defined IFAnet scopes can then be integrated into each other and make a single cluster or a cluster cloud. Therefore, the augment of scopes is scalable and yet the integrity is always maintained. For example, without limitation, during a corporate merger, a banking community with 10 members may be merged into another banking community with 20 members. The merge does not impact the members of each community. The members of each community are still connecting to their original usher i-Collaborators. Again, the scope of a community or a cluster is user defined. Whether it is an augment or shrinking, it is transparent to its members.

Figure 9:
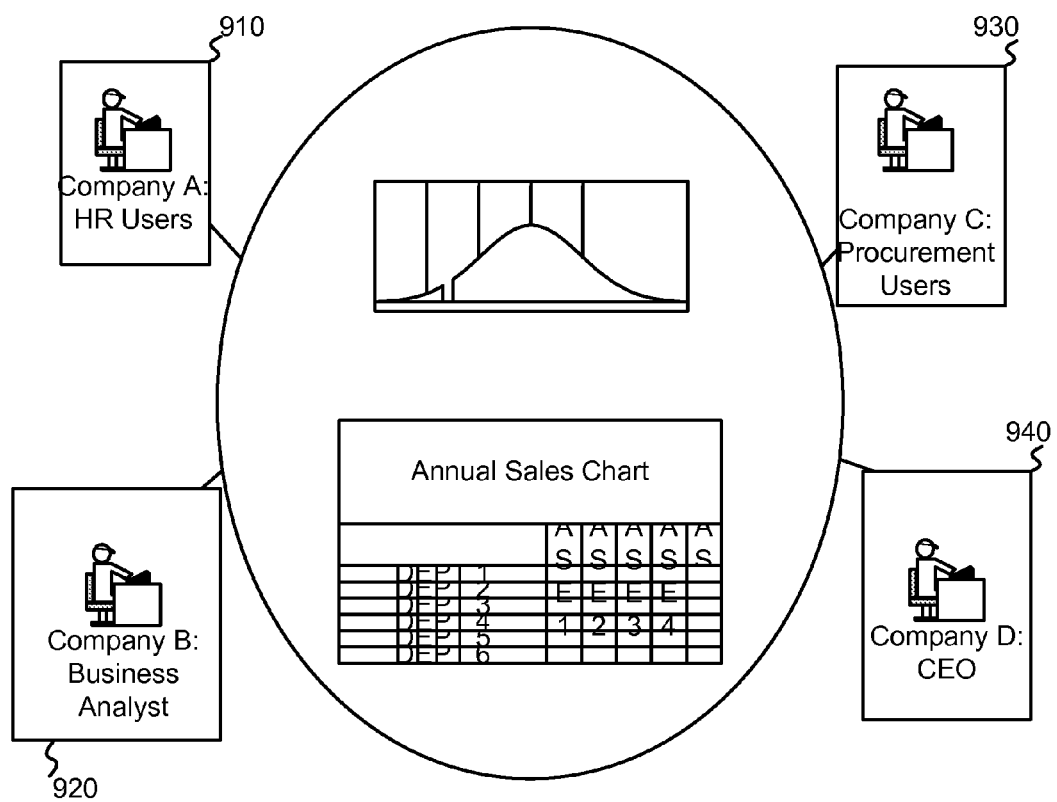
FIG. 9 illustrates an example of collaborative business intelligence provisioned at the member, collaborator, cluster, and cloud levels in an integrated and collaborative computing environment, in accordance with an embodiment of the present invention.

FIG. 9 illustrates an example of collaborative business intelligence in an integrated and collaborative computing environment, in accordance with an embodiment of the present invention. In the present embodiment, an IFAnet architecture enables business users 910, 920, 930 and 940 to conduct collaborative business activities with their business partners or receive on-demand services within the same model directly, effectively, globally, and electronically, by simply logging in directly to the integrated and collaborative business activity center (bizCenter), or from a proprietary software module with communication and mapping once their formats are recorded with an usher i-Collaborator 950. With the infrastructure provided by the software integration and collaboration framework, the business partners conduct their collaborative business interaction at the bizCenter, automate the flow of collaborative business activities with integrated and collaborative business activity flow automation (BAFA), receive business intelligence and advices for the best business practices, and analyze their key performance indicators to measure progress toward business goals with BI-Advisors.

Figure 10:
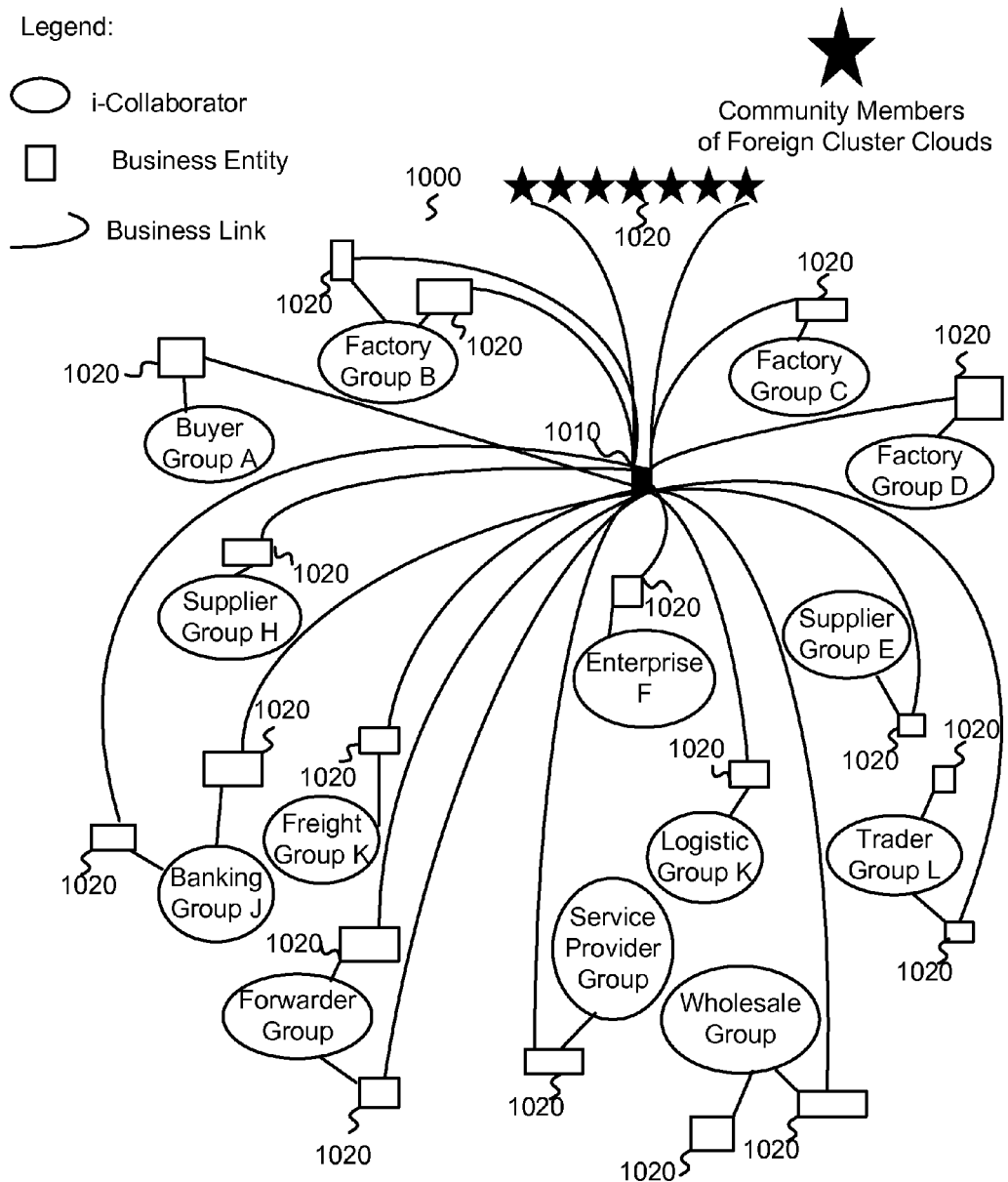
FIG. 10 illustrates an exemplary business entity using the proposed plug-n-trade business model to conduct collaborative business activities globally, in accordance with an embodiment of the present invention.

FIG. 10 illustrates an exemplary business entity 1010 using a system with a plug-n-trade function and a map once for all function to conduct collaborative business activities, in accordance with an embodiment of the present invention. In the present embodiment, business entity 1010 can conduct business with business partners 1020 directly as a Business Star (bizStar) 1000 without knowing the complexities of the underlying infrastructure as if all business entities are working under the same software system. In bizStar 1000 activity radiates from business entity 1010 out to all of its business partners 1020. BizStar 1000 is uniquely identified globally by its business partners 1020 with the combination of Cloud ID, Cluster ID, giBID and siBID and intelligence built into each level of identifications to not only uniquely identify business entity 1010 but also the nature of business entity 1010, such as, but not limited to, the geographic location, and type of business provided. The Cloud ID is a cluster cloud identification assigned to identify a cloud of clustered collaborative business communities within a cloud forest. A Cluster ID is an identification assigned to a cluster of collaborative business communities to uniquely identify itself within a cloud. A global intelligent business identification (giBID) is an identification assigned to a collaborative community to uniquely identify itself within a cluster of collaborative business communities. For example, without limitation a buyer group A 1030. in the present embodiment. A bizStar intelligent business identification (siBID) is an identification assigned to bizStar 1000 to identify itself within a collaborative business community. Every business entity forms its own bizStar and can conduct business activities directly and electronically with business partners globally.

Figure 11:
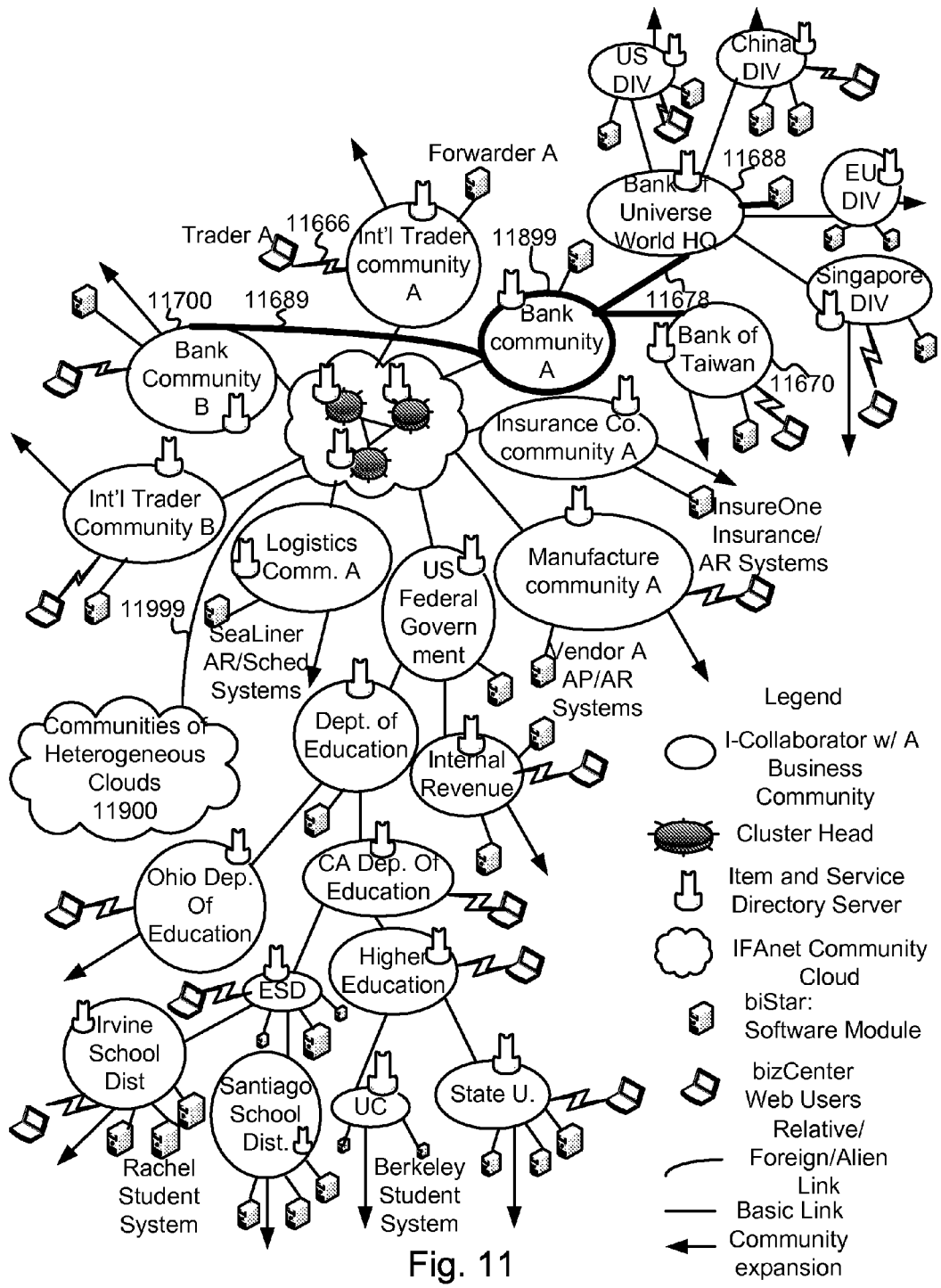
FIG. 11 illustrates an exemplary implementation of how the integrated architecture fits in to a real business community model and the advantages of features such as, but not limited to, traffic localization, data security and privatization, stability, work load balancing, and global communication in an integrated and collaborative e-commerce, Global collaborative Grid Computing (GC-square), and On-Demand Service environment, in accordance with an embodiment of the present invention.

FIG. 11 illustrates an exemplary implementation of how the integrated architecture fits in to a real business community model and the advantages of features such as, but not limited to, traffic localization, data security and privatization, stability, work load balancing, and global communication in an integrated and collaborative computing environment, in accordance with an embodiment of the present invention. Under the plug-n-trade business model of the present embodiment, business partners across different business communities are linked with the integrated and collaborative framework where they conduct business as if they were working on the same system. The detail technical implementation of the infrastructure is transparent to the business communities. The initial setup comprises mapping once with their serving collaborator record formats or simply logging into the integrated and collaborative business activity center (biz-Center) and plugging into the network. The business communities are then ready to trade with their business partners. The characteristics of the plug-n-trade model based on IFAnet architecture of the present embodiment include, but are not limited to, the following.

In the present embodiment, the bizCenter is accessible directly to conduct collaborative business activities 11666 by business partners. The traffic of inner-community business transactions 11678 are only limited locally within the community itself. This localization of traffic generally prevents the data flow going out of the community and enhances the data security and privatization. For example, without limitation, the transactions of departments in a Bank of Universe 11688 are not routed through the outside world. The transaction between Bank of Universe 11688, a Bank of Taiwan 11670 and other banks in a bank community 11899 are kept within bank community 11899. Trading partners with the same business or interests in common can form their own private communities and yet are able to participate in global collaborative communities. Furthermore, at anytime new communities can be formed and join the global community with no negative impact to the existing communities. The relations between entities can be enhanced for various reasons, for example, without limitation, the data communication of banks between bank community 11899 and a bank community 11700 may need to be tightened and secured by establishing a foreign link 11689. In order to provide work load balancing in the present embodiment, business activities are handled within their own communities. Business traffic is kept within each community and only cross-community business activities are sent out of their communities. Therefore, there are less chances of bottlenecking and single point of failure. Global communication is supported within the proposed integrated and collaborative communities in the present embodiment, and yet, communities supported by a heterogeneous implementation of the network in a heterogeneous cloud 11900 are also reachable through a foreign link 11999 via i-Collaborators who are capable of mediating cross-cloud requests by making the effort of UOW package format conversion and package forwarding.

A Global Grid Servicing model is developed when community members register their On-Demand services to their usher collaborators to form local grid servers. Based the present embodiment for architecture and collaborative framework, local grids are connected together across cluster clouds to create the Global Grid Servicing model While the On-Demand services are published from community members to their usher collaborators, grid-aware software, for example, but without limitation, would run on the usher collaborators and utilizing the resources from its community members, such as the CPU process power and memory capacities. In addition, the present invention's architecture enables software, whether grid-aware or not, running on their usher collaborators, to be shared by the community members. The business data can be either persistence or non-persistence. In the case of persistence, the data are stored with their usher database; otherwise, the data are stored locally within each member. Usher collaborators form outer security firewalls for their members. The present invention's various types of links and the mapping profiles infrastructure enable collaborative communication among collaborators across cluster clouds, and thereby forming a Global Collaborative Grid Computing model (GC-SQUARE).

The preferred embodiment of the present invention provides an address locating system to describe an address structure in an integrated collaborative system as a multiple dimension scheme: the first dimension represented by a sequence of different notations in an address sequence as a vertical dimension, Y axis, the second dimension represented by a set of IDs of the same notation as a horizontal dimension, X axis, and the third dimension represented by a set of escape IDs starting with an escape notation, for an ID along the X axis and the Y axis it describes, Z axis.

An addressable element can be represented as simple as by having a ID and a destination code, or a starting notation noting the start of address sequence followed by a plurality of IDs, where a new notations indicating a start of new section in an address sequence, and an escape notations indicating a start of a section of IDs that is internal or supplemental to the ID it describes.

Different notations that construct an address scheme provide important context and meanings to programs that process the address. They represent the boundaries of domains in the network where each domain may have different ways of interpreting the set of addresses that belong to it.

The Multi-Notation Address Locator is to locate every addressable object in the network, such as, but not limited to, cluster clouds, clusters, i-Collaborators, members, users, mapping profiles, services and merchants items. Each notation used represents a segment within a network. Using multiple notations not only distinguish different addressable object among multiple domains but also correlate these domains together to form a globally unique addresses for the object, based on the domain relationship, as illustrated in FIG. 12.

FIG. 12 illustrates an exemplary flow to construct an inter-domain address sequence using multiple notations. In the present embodiment, the flow starts with the first notation 1210 indicating the highest level of network architecture, followed by an ID 1230 indicating the first addressable identification in the sequence in order to locate the destination. The leading notation may be omitted by the link 1220. If there is more than one addressable object need to be traversed within the same domain in order to get to the destination, the repeating point 1240 directs the flow to insert the notation 1250 of the same domain into the sequence. The flow is forwarded at the point 1280 to include the next addressable identification 1230 in to the sequence. Therefore a plurality of IDs 1230 in the same domain can be listed in the sequence until the next domain is crosses by adopting a new notation 1270. The same flow mentioned above will be repeated for each new domain needed to be traversed in order to get to the destination. For each addressable identification listed in the sequence, sometimes additional information is needed to assist the system which parses and executes the locating process; the escape notation 1260 is used for that purpose. Therefore a plurality of supplemental IDs for the same addressable object can be listed in the sequence until the next addressable object is encountered. When all the addressable objects are listed in the sequence in order to locate the destination, the final notation 1290 of which the destination object belongs is inserted into the sequence and finally finished by specifying the destination identification 1289 in the address sequence. An example 1299 using the Multi-Notation Address Locator is given for locating a service item in an integrated collaborative ecommerce system comprising multiple cluster clouds and multiple levels of merchant categories.

Table 4 illustrates an exemplary Directory Information Tree Schema with various object class definitions for constructing cluster cloud collaborators and defining structures for merchant and on-demand services and mapping profile in accordance with an embodiment of the present invention.

TABLE 4

```
objectclass ( oid NAME 'IFACollaboratorBase'
            SUP top STRUCTURAL
            DESC 'IFAnet Collaborator Base Object'
            MUST (collaboratorName $ IP_Address )
            MAY (giBID $ clusterID $ cloudID $ portNumber) )
objectclass ( oid NAME 'IFACollaborator'
            SUP IFACollaboratorBase STRUCTURAL
            DESC 'IFAnet Collaborator'
            MUST (parentCollaborator)
            MAY (communityName $ parent_giBID $ clusterName
                $ cloudName $ collaboratorLinks) )
objectclass ( oid NAME 'IFAClusterHead'
            SUP IFACollaboratorBase STRUCTURAL
            DESC 'IFAnet Cluster Head Collaborator'
            MUST (clusterName)
            MAY (communityName $ cloudName $ clusterLinks) )
```

TABLE 4-continued

```
objectclass ( oid NAME 'IFALinks'
            SUP IFABase AUXILIARY
            DESC 'IFAnet Linked Collaborators'
            MUST (collaboratorName $ linkType $ securityLevel)
            MAY (giBID $ clusterName $ coummunityName
                $ certificate) )
objectclass ( oid NAME 'IFAClusterLinks'
            SUP IFALinks AUXILIARY
            DESC 'IFAnet Cluster Linked Head Collaborators'
            MUST (clusterName
objectclass ( oid NAME 'IFAMember'
            SUP IFABase STRUCTURE
            DESC 'IFAnetCommunity Member'
            MUST (memberName, collabortorName, clusterName,
                cloudName, ip_Address)
            MAY (siBID $ giBID $ clusterID $ cloudID) )
objectclass ( oid NAME 'IFAMapProfileHeader'
            SUP top AUXILIARY
            DESC 'IFAnet Record Mapping Profile Header'
            MUST (formatIDA $ formatIDB $ status)
            MAY (version) )
objectclass ( oid NAME 'IFAMapProfileDetail'
            SUP IFAMapProfileHeader
            DESC 'IFAnet Record Mapping Profile Detail'
            MUST (FieldIDA $ FieldIDB $ Status)
            May (DefaultValue) )
objectclass ( oid NAME 'IFAMerchandiseBase'
            SUP top STRUCTURAL
            DESC 'IFAnet Merchandise Base Object'
            MUST (merchandiseName $ serviceType $
                memberName )
            MAY (merchaniseID, siBID $ giBID $ clusterID
                $ cloudID) )
objectclass ( oid NAME 'IFAMerchandise'
            SUP IFAMerchandiseBase STRUCTURAL
            DESC 'IFAnet Merchandise Object'
            MUST (unitPrice, uom)
            MAY (categories, description, photo, promotion, url))
```

In an embodiment of the present invention, both Real Application Cluster and Federated Server clustering of Application servers or Database servers are realized. In a highly efficient structure, application servers are linked in such way that the Head Nodes dispatch workload to its child nodes. If the workload of each child node exceeds an adjustable threshold that each child node can support, then the child nodes one level down of each parent nodes in turn shares the load. Each node serves two roles, application server and load balancer. Whenever the load of one node exceeds its predetermined capacity, the load is flowed into its child nodes. The structure of the present embodiment provides a way of utilizing the minimum number of servers and therefore reduces the amount of global caching and inter-database operations. The structure is able to group servers based on the multiple layers of clustering structure. In the cluster cloud configuration, the heads of clusters serve as the first layer of clustered nodes, the children of the heads, the second layer, the children nodes of the second layer, the third layer, and so on. Different group of servers can be designated to handle different category of loads. By aggregating the servers across layers vertically into user-defined clusters and disaggregating loads to be served by the servers at the same layer horizontally, the present embodiment enables the collaborated computing to reach the best performance and yet reduce the overhead to the minimum. With the present model of centralized control and distributed management and operation, the Head Links, connecting the clustered nodes to their cluster head, serves as the channel by which the statistics of the clustered nodes are communicated to the head. Cluster-wide settings can then be adjusted accordingly, such as the load threshold of each node.

In a Storage Area Network, the number of disks in the Disk Array Enclosure (DAE) is limited by the capacity of Disk Processor Enclosure (DPE) can support. As the needs for storage increases, more DPE and DAE are put into the fabric network. As the number of DPE increases, so as the complexity and the overhead. In an embodiment of the present invention, the proposed architecture provides clustered DPEs with central controls and makes Logical Unit Number (LUN) spindles created across DAEs possible to gain the collaborated processing power of the clustered DPEs and memory caches. To increase the performance and access speed, DPEs are clustered vertically and disk arrays are partitioned to form LUNs horizontally to reflect the nature of application or business data. The topology of the fabric network is greatly simplified since each cluster is represented by its Head DPE and connected to fabric switches. The Head distributes load to clustered DPEs to avoid bottleneck on hotspot DPEs. The Foreign Links can be used as the links to other DPE clusters, for example, but without limitation, as backup sites. The Alien Links can be used as the links to other remote DPEs running, for example, but without limitation, as disaster recovery sites.

In an embodiment of the present invention, the infrastructure provides an excellent means for enhancing the current multiprocessing computation model by clustering CPUs vertically and distributing the process loads horizontally. The head CPUs oversee the load statistics among the member CPUs via the Head Link channels.

In an embodiment of the present invention, the highly efficient integrated and collaborative framework structures provide an excellent structure for online gaming hosts to collaborate together and form a more robust gaming playground. Players are able to match with each other across multiple hosts. The winners of each host on the same layer match with each other via Relative Links and controlled by the parent hosts of the upper layers. With the multiple layer infrastructures, the winners of the lower layers advance to the higher layers and eventually meet at the hosts of the first layer, the heads, for the Cluster Championship. The winners of each cluster match with each other via the foreign Links, which connect cluster heads together as a cluster cloud. Cyber Tournaments at the cluster or at the cluster cloud level can thereby be conducted.

As national and local electronic voting is adopted, an embodiment of the present invention provides the infrastructure for a means for voting servers to be arranged to reflect a judicious relation based on a collaborating model. The Head servers serve as the central headquarters and oversee the status and collect statistics of each clustered server via head links, while each parent servers aggregates the result of its child servers. The present invention provides a computing model with highly efficient integrated and collaborative framework structures with centrally controlled and distributed management and operation.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC §112 (6) it is intended that the corresponding means for and/or steps for carrying out the claimed function also include those embodiments, and equivalents, as contemplated above that implement at least some novel aspects and objects of the present invention in the jurisdiction of the USA. For example, synchronizing the companies' merchandize items and services with the LDAP servers of usher i-Collaborators, the data agent for retrieving from and writing to the database with UOW, creating conversion profiles from proprietary format to the format of the usher i-Collaborators and the BizCenter to initiate business transaction or obtain Business Intelligence form BI-Advice may be performed and/or located outside of the jurisdiction of the USA while the remaining method steps and/or system components of the forgoing embodiments are typically required to be located/performed in the U.S. for practical considerations.

Having fully described at least one embodiment of the present invention, other equivalent or alternative methods of implementing an integrated and collaborative computing environment according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A system for integrating disjoined but related network components, the system comprising:

a network comprising a plurality of computer systems processing a plurality of integrated collaborators where at least one of said plurality of integrated collaborators is designated as a head of a cluster and in charge of tracking cluster topology, synchronizing directories, making cluster-wide parameters and extending communication channels across clusters, at least one of said plurality of integrated collaborators is designated as a parent and at least one of said plurality of integrated collaborators is designated as a child, said head, parent and child being connected by a plurality of links, each of said integrated collaborators serving at least one community member, said plurality of integrated collaborators being grouped into at least one or more clusters where one or more clusters form a cluster cloud where said plurality of links connect said clusters and said cluster clouds, said integrated collaborators configured to receive a data set, from a community member connected to a one of said plurality of computer systems, having contents in a pre-determined format and deliver, to at least one receiving community member over said network, said data set in an acceptable format for a data processing application of said at least one receiving community member, where at least one integrated collaborator has converted said contents of said data set in said pre-determined format to said acceptable format such that the network components communicate with each other and conduct collaborative activities; and in which the plurality of computer systems process a search for collaborative business activities, by submitting a query, for business partners and merchants served by said network as community members, from a community member to an integrated collaborator, said query indicating search criteria, including product type, services or merchants, and searching scopes, including local, cluster-wide or inter-cluster wherein the local searching scope, is to target the business partners served by the same collaborators as the collaborators serving the community members that submitted the query, and at least some of the business partners served by the child collaborators of said same collaborators serving said community members, wherein the cluster-wide searching scope, is to target the business partners served by said collaborators sharing at least some of the same head collaborators as that belonging to said collaborators serving said community members, which include all business partners served by all collaborators within a cluster, and wherein the inter-cluster searching scope, is to target the business partners including those at the cluster-wide searching scope, and business partners served by different clusters;

if said scope is local, parsing said query, retrieving matched records, and returning search results comprising said matched records with their global unique addresses of business partners and merchants, by said integrated collaborator;

if said scope is cluster-wide, parsing said query and forwarding said query to a head of said integrated collaborator's cluster by said integrated collaborator, said head parsing said query, retrieving matched records and returning search results comprising said matched records with their global unique addresses of business partners and merchants;

if said scope is inter-cluster, parsing said query, converting said query based on a category structure of an other cluster head and forwarding said converted query to said other cluster head by said integrated collaborator's cluster head, receiving search results comprising matched records with their global unique addresses of business partners and merchants from said other cluster head, converting said search results based on said category structure of said other cluster head to a category structure of said integrated collaborator's cluster head, and returning said converted search results back to said integrated collaborator;

by, receiving said search results by said community member;

by, navigating said search results, indicating intended transactions on said search results, and submitting said search results with said intended transactions to said integrated collaborator, by said community member;

by, grouping said results by said global unique addresses of business partners and merchants, compiling the grouped results into at least one standard business document and forwarding said at least one standard business document to one or more integrated collaborators serving said business partners and merchants, by said integrated collaborator;

by, receiving said at least one standard business document, editing and submitting the standard business document back to said integrated collaborators for delivery to said community member, by said business partner; and by, receiving and forwarding the edited standard business to said community member by said integrated collaborator, thereby initiating collaborative business activities.

2. The system as recited in claim 1, further comprising specifying a format key corresponding to said pre-determined format allowing said integrated collaborator to indicate if conversion of contents of said data set in said pre-determined format to said acceptable format is required.

3. The method as recited in claim 2, further comprising specifying a destination address allowing said integrated collaborator to determine an optimal path by which said data set will travel over said network and which of said plurality of integrated collaborators can perform said conversion if said conversion is indicated.

4. The system as recited in claim 1, further comprising indicating a delivery option for said data set where delivery options comprise point-to-point and broadcast with scopes of downstream and upstream.

5. The system as recited in claim 1, further comprising specifying if a copy of said data set is to be retained on said network after said data set is delivered.

6. The system as recited in claim 1, further comprising including with said data set an indication of an intended transaction for said contents of said data set.

7. The system as recited in claim 1, wherein said data set comprises a unit of work (UOW).

8. The system as recited in claim 1, wherein said clusters are dynamic and can grow, shrink and self-heal, when said cluster grows, a dynamic mapping is updated and visible to said integrated collaborators, when said at least one of said parents is removed, said at least one child adopts the parent of the removed parent integrated collaborator as their new parent and said dynamic mapping is updated and visible to said integrated collaborators and, when said at least one of said parents fails, said at least one child adopts the parent of the failed parent integrated collaborator as their new parent and said dynamic mapping is updated and visible to said integrated collaborators.

9. The system as recited in claim 1, where said head comprises a dynamic mapping of relations of integrated collaborators within said cloud and a destination path for said data set can be determined.

10. The system as recited in claim 1, further comprising a mapping profile for converting from said pre-determined format to said acceptable format and said mapping profile is shared by said integrated collaborators.

11. The system as recited in claim 1, wherein a global unique address is assigned to every addressable object in said system.

12. The system as recited in claim 1, wherein said category structure is shared within said cluster.

13. The system as recited in claim 1, wherein inter-cluster transaction use a category structure map to convert category structures among said clusters.

14. The system as recited in claim 11, wherein said global unique address is an address sequence constructed by using a multiple-notation address locating method to indicate a relationship of clusters and said integrated collaborators to said addressable object.

* * * * *